United States Patent [19]

Asano et al.

[11] Patent Number: 5,629,669
[45] Date of Patent: May 13, 1997

[54] RUNNING CONTROL APPARATUS FOR VEHICLES AND ALARM APPARATUS FOR VEHICLES

[75] Inventors: Katsuhiro Asano, Toyoake; Yoshikazu Hattori, Nagoya; Masashi Mizukoshi, Susono; Takashi Shigematsu, Mishima, all of Japan

[73] Assignee: Toyota Jidosha Kabushiki Kaisha, Aichi-ken, Japan

[21] Appl. No.: 450,583

[22] Filed: May 25, 1995

Related U.S. Application Data

[63] Continuation of Ser. No. 242,839, May 16, 1994, abandoned.

[30] Foreign Application Priority Data

| May 21, 1993 | [JP] | Japan | 5-120217 |
| May 27, 1993 | [JP] | Japan | 5-126361 |
| May 27, 1993 | [JP] | Japan | 5-126362 |

[51] Int. Cl.⁶ ................................ B60Q 1/00
[52] U.S. Cl. ............ 340/436; 340/435; 340/903
[58] Field of Search ............... 340/436, 435, 340/903, 460, 461; 358/103, 105

[56] References Cited

U.S. PATENT DOCUMENTS

| 4,706,195 | 11/1987 | Yoshino et al. | 364/426.04 |
| 4,947,952 | 8/1990 | Kajiwara | 364/426.01 |
| 5,173,859 | 12/1992 | Deering | 340/436 |
| 5,355,118 | 10/1994 | Fukuhara | 340/435 |
| 5,377,108 | 12/1994 | Nishio | 340/669 |

FOREIGN PATENT DOCUMENTS

| 3304620 | 9/1983 | Germany . |
| 4140327 | 6/1993 | Germany . |
| 58-139214 | 8/1983 | Japan . |
| 58-195113 | 11/1983 | Japan . |
| 59-105587 | 6/1984 | Japan . |
| 61-77533 | 4/1986 | Japan . |
| 61-77534 | 4/1986 | Japan . |
| 2-133800 | 11/1990 | Japan . |
| 3-29500 | 3/1991 | Japan . |
| 3-295000 | 12/1991 | Japan . |
| 4-304600 | 10/1992 | Japan . |
| 5-104977 | 4/1993 | Japan . |

OTHER PUBLICATIONS

F. Ackemann, "Abstandsregelung mit Radar", Spectrum der Wissenschaft, pp. 25–34, Jun. 1980.

Primary Examiner—Thomas Mullen
Assistant Examiner—Daryl C. Pope
Attorney, Agent, or Firm—Oliff & Berridge

[57] ABSTRACT

A driver regards a relative acceleration of a subject vehicle with respect to an object such as a preceding vehicle, an obstacle and the like as one having highest priority, and performs control such that deceleration is immediately started even if a relative velocity is small if the relative acceleration is large. Taking note of this point, the relative acceleration between the subject vehicle and the object is detected, and it is judged whether or not the subject vehicle and the object relatively approach each other at a relative acceleration not less than a predetermined value. A vehicle velocity is controlled such that the relative acceleration is not more than a predetermined target relative acceleration (for which a direction for approach is positive) when the subject vehicle and the object relatively approach each other at a relative acceleration not less than the predetermined value. Thus, the start of deceleration felt by the driver is adequate.

14 Claims, 17 Drawing Sheets

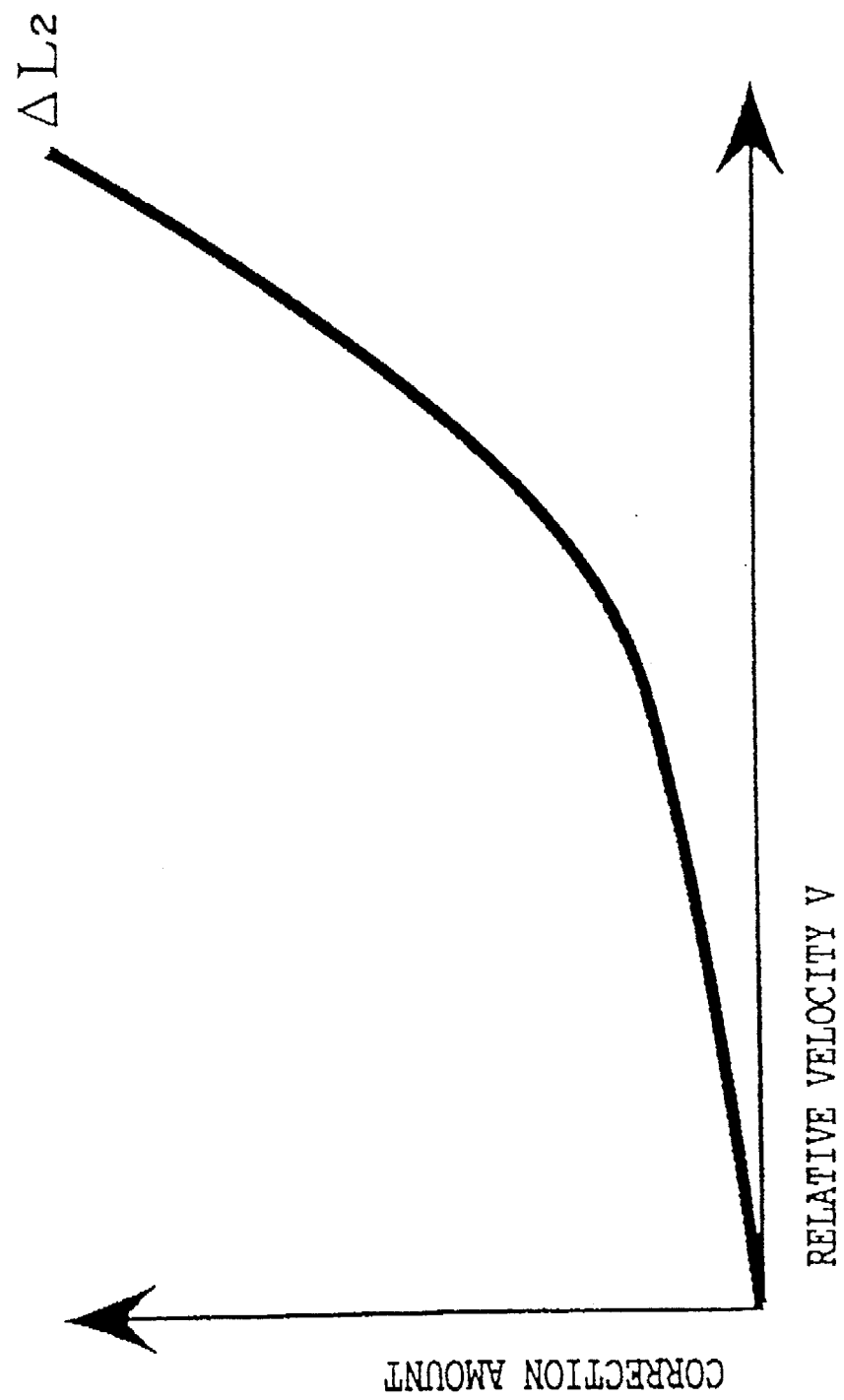

RUNNING CONTROL APPARATUS FOR VEHICLES AND ALARM APPARATUS FOR VEHICLES

This is a Continuation of application Ser. No. 08/242,839 filed May 16, 1994, now abandoned.

BACKGROUND OF THE INVENTION

1. Field of the Invention

The present invention relates to a running control apparatus and an alarm apparatus for vehicles, and in particular to a running control apparatus for vehicles which performs running control to allow the subject vehicle to follow a preceding vehicle and makes running control so that the subject vehicle does not collide with an obstacle, and an alarm apparatus for vehicles for preventing collision with a preceding vehicle or an obstacle by generating an alarm.

2. Related Art

Conventionally, as a following running control apparatus for controlling following running of an automobile, an apparatus is known in which distance and relative speed between a preceding vehicle and a subject vehicle are used to control vehicle velocity so that the distance between the preceding vehicle and the subject vehicle is kept at a safe distance. (Japanese Patent Laid-open No. 61-77533). In addition, an apparatus for controlling distance between vehicles is known in which an acceleration of a preceding vehicle is used to change the distance between that vehicle and the subject vehicle (Japanese Utility Model Laid-open No. 2-133800). Further, an apparatus is known in which distance between a preceding vehicle and a subject vehicle is used to determine target vehicle speed. This target vehicle speed is corrected on the basis of relative acceleration, thereby controlling vehicle speed (Japanese Utility Model Laid-open No. 3-295000).

However, in the conventional apparatus in which vehicle speed is controlled according to vehicle distance and relative velocity, problems arise in that a period of time is required, with respect to the deceleration of the preceding vehicle, for the distance between the vehicles and relative speed to change by predetermined values, and the response characteristic to the rapid deceleration of the preceding vehicle deteriorates. Thus, the driver of the subject vehicle sometimes feels that the timing of deceleration is late.

In addition, the apparatus for controlling the distance between vehicles in which the acceleration of the preceding vehicle is used to change the target distance between the vehicles has problems in that when the target distance between vehicles is shortened in accordance with a positive acceleration of the preceding vehicle (the nearing direction is positive), a time lag occurs until the preceding vehicle reaches the target distance between the vehicles, the response characteristic to the rapid deceleration of the preceding vehicle deteriorates in the same manner as described above, and it is felt that the timing of the deceleration of the subject vehicle is late. On the other hand, when the target distance between vehicles is lengthened in accordance with the deceleration of the preceding vehicle, the response characteristic to rapid deceleration of the preceding vehicle is improved. However, there is unnecessary excessive deceleration.

Further, in the case of the apparatus for controlling vehicle speed in which the target vehicle velocity is corrected on the basis of relative acceleration, it is difficult to calculate a correction amount which is adequate for a driver, and also difficult to adequately control the starting time for decelerating of the subject vehicle.

In addition, as a running control apparatus which controls a subject vehicle so as to follow a preceding vehicle, Japanese Patent Laid-open No. 61-77534 discloses a technique in which it is judged whether or not the deceleration of the subject vehicle is necessary based on distance and relative speed between the preceding vehicle and the subject vehicle. If it is judged that deceleration is necessary, then in accordance with the magnitude of the difference between the deceleration of the subject vehicle and a predetermined deceleration reference value, an appropriate operation is selected from one of the deceleration operations—letting off the throttle, an exhaust brake operation, a down shifting operation, and a brake operation so as to decelerate. In such a manner, the judgment of deceleration has been made in the prior art on the basis of the distance between vehicles and the relative speed of the preceding vehicle.

However, for example, even if the preceding vehicle decelerates rapidly, there is a short time lag until changes in relative speed and distance between the vehicles are detected. Accordingly, the above-mentioned apparatus in which deceleration is controlled on the basis of the distance between vehicles and relative speed has had problems in that a period of time is required from the time that the preceding vehicle begins rapid deceleration until the execution of a strong deceleration (for example, a sudden braking operation) which corresponds to the rapid deceleration of the preceding vehicle, and a sense of incongruity on the part of the driver. In addition, in order to resolve the above-mentioned problems, for example, if a large value is set as the deceleration reference value, the decelerating operation is selected to allow the deceleration of the subject vehicle to coincide with the reference value. As a result, deceleration is performed at an unnecessarily and excessive level with respect to the gradual deceleration of the preceding vehicle. Accordingly, a sense of incongruity is given to the driver.

In order to prevent accidents such as rear-end collisions with preceding vehicles and the like, various apparatuses for generating an alarm to a driver has been proposed. Japanese Patent Laid-open No. 59-105587 discloses a vehicle collision alarm apparatus in which a distance between a preceding vehicle and a subject vehicle is detected, an alarm is sounded when the distance between the vehicles becomes smaller than a reference value. At the same time the above-mentioned reference value is changed in accordance with the relative speed of the preceding vehicle. In addition Japanese Patent Laid-open No. 4-304600 discloses a running state judging apparatus in which a future distance between vehicles is predicted on the basis of a vehicle distance, speed of the subject vehicle and speed of a preceding vehicle in order to determine whether or not a dangerous state has developed.

However, for example, in a case in which the preceding vehicle rapidly decelerates and the like, there is a short time lag until the distance change between the vehicles are detectable by not less than a predetermined value. Therefore, the above-mentioned apparatus in which the alarm is sounded on the basis of the distance between vehicles has had problems in that it is difficult to sound the alarm within a short time period after the preceding vehicle starts rapid deceleration. In addition, there has been a problem that, for example, when the reference value as a threshold value to generate the alarm is made large in order to resolve the above-mentioned problem, the alarm is sometimes generated even when the driver determines the circumstances to be safe, thereby giving the driver a sense of incongruity.

In any one of the above-mentioned apparatuses, danger is judged on the basis of the magnitude of the distance between vehicles with respect to the preceding vehicle, and an alarm is sounded, for example, in a case in which a driver does not notice that the distance between vehicles has become short due to the deceleration and the like of the preceding vehicle. Owing to this alarm, the driver can recognize states in which the distance between the vehicles becomes short, which makes the risk of having a rear-end collision with the preceding vehicle. The driver can then decelerate the vehicle by operating a brake and the like, so as to prevent the occurrence of a rear-end collision with the preceding vehicle.

DISCLOSURE OF THE INVENTION

The present invention has been made to solve the above-mentioned problems. A first object is to provide a running control apparatus for vehicles in which a driver feels the start timing of deceleration to be adequate.

Further, a second object is to provide a running control apparatus for vehicles in which deceleration can be performed with adequate timing without giving a driver a sense of incongruity.

Furthermore, a third object of the present invention is to provide an alarm apparatus for vehicles in which an alarm can be generated with adequate timing without giving a driver a sense of incongruity.

In order to achieve the above-mentioned first object, the first invention is constituted by comprising a relative acceleration detecting means for detecting relative acceleration of a subject vehicle with respect to an object, that is a relative acceleration between the subject vehicle and the object, a judging means for judging whether or not the subject vehicle and the object relatively approach at a relative acceleration not less than a predetermined value, and a control means for controlling vehicle velocity in such a manner that relative acceleration is not more than a predetermined target relative acceleration when the subject vehicle and the object relatively approach at the relative acceleration not less than the predetermined value.

In order to achieve the above-mentioned second object, the second invention is constituted by comprising a distance detecting means for detecting a distance between a subject vehicle and an object, a relative velocity detecting means for detecting relative velocity between the subject vehicle and the object, a relative acceleration detecting means for detecting relative acceleration between the subject vehicle and the object, and a decelerating means for decelerating the subject vehicle if relative acceleration between the subject vehicle and the object is less than a predetermined value, the distance between the subject vehicle and the object is less than a first predetermined value and not less than a second predetermined value which is smaller than the first predetermined value, and the subject vehicle and the object relatively approach at a relative velocity not less than a predetermined value, and if relative acceleration between the subject vehicle and the object is less than the predetermined value, and the distance between the subject vehicle and the object is less than a third predetermined value which is smaller than the first predetermined value and larger than the second predetermined value, and not less than the second predetermined value.

In order to achieve the above-mentioned second object, the third invention is constituted by comprising a distance detecting means for detecting a distance between a subject vehicle and an object, a relative velocity detecting means for detecting relative velocity between the subject vehicle and the object, a relative acceleration detecting means for detecting relative acceleration between the subject vehicle and the object, a first decelerating means for decelerating the subject vehicle at a deceleration not less than a predetermined value if the distance between the subject vehicle and the object is less than a first predetermined value, and the subject vehicle and the object relatively approach at a relative acceleration not less than a predetermined value, and if the distance between the subject vehicle and the object is less than a second predetermined value which is smaller than the first predetermined value, and a second decelerating means for decelerating the subject vehicle at a deceleration less than the predetermined value if the relative acceleration between the subject vehicle and the object is less than the predetermined value, the distance between the subject vehicle and the object is less than the first predetermined value and not less than the second predetermined value, and the subject vehicle and the object relatively approach at a relative velocity not less than a predetermined value, and when relative acceleration between the subject vehicle and the object is less than the predetermined value, and the distance between the subject vehicle and the object is less than a third predetermined value which is smaller than the first predetermined value and larger than the second predetermined value, and not less than the second predetermined value.

In order to achieve the above-mentioned third object, the fourth invention is constituted by comprising a relative acceleration detecting means for detecting relative acceleration between a subject vehicle and an object, a distance detecting means for detecting a distance between the subject vehicle and the object, a judging means for judging whether or not deceleration by a brake operation is performed, and an alarm means for generating an alarm if it is judged that the subject vehicle and the object are relatively approaching at a relative acceleration not less than a predetermined value, the distance between the subject vehicle and the object is not more than a predetermined value, and the deceleration by the brake operation is not performed.

In order to achieve the above-mentioned third object, the fifth invention is constituted by comprising a relative acceleration detecting means for detecting relative acceleration between a subject vehicle and an object, a relative velocity detecting means for detecting relative velocity between the subject vehicle and the object, a distance detecting means for detecting a distance between the subject vehicle and the object, a judging means for judging whether or not deceleration by engine braking is performed, and an alarm means for generating an alarm if it is judged that relative acceleration between the subject vehicle and the object is less than a predetermined value, the distance between the subject vehicle and the object is not more than a first predetermined value, the subject vehicle and the object relatively approach at a relative velocity not less than a predetermined value, and the deceleration by engine braking is not performed, or if it is judged that relative acceleration between the subject vehicle and the object is less than the predetermined value, the distance between the subject vehicle and the object is not more than a second predetermined value which is smaller than the first predetermined value, and deceleration by engine braking is not performed.

The principle of the first invention is explained hereinafter. Incidentally, in the following, with respect to relative velocity and relative acceleration, a direction in which the subject vehicle and the preceding vehicle approach is positive, respectively. FIG. 4 shows a result of an analysis of experiments performed by the present inventors, which illustrates a relationship between the time period after the preceding vehicle starts approaching until the following vehicle (subject vehicle) starts deceleration and relative acceleration between the preceding vehicle and the subject vehicle. As understood from the figure, when relative acceleration is large (not less than about 0.15 G), the time period until the start of the act of deceleration in which a foot is separated from an accelerator pedal (letting off the throttle) and a brake pedal is pushed (brake-on), that is the time period until deceleration is started, is about 1 sec. which is short, wherein a driver immediately starts the act of deceleration when the preceding vehicle or the obstacle approaches, and relative acceleration at that time is large.

In addition, FIGS. 5A and 5B show a relationship between brake pressure and relative velocity, and a relationship between brake pressure and relative acceleration in accordance with the passage of time. In the figures, positions indicated by arrows (a) indicate a point in time at which deceleration is started by the driver. As is understood from the figures, when relative acceleration is large, deceleration is started although the relative velocity between the preceding vehicle and the subject vehicle is sufficiently small. Namely, it is understood that the driver immediately starts the act of deceleration when relative acceleration is large even if relative velocity is small.

FIGS. 6A and 6B show operation amounts when an act of deceleration that is different from that in FIGS. 5A and 5B, is started. As is understood from FIGS. 6A and 6B, the driver starts maintaining brake pressure at points A where relative acceleration is small. Brake pressure reduction is carried out at points B where relative acceleration is small and relative velocity is small. Namely, when the relative acceleration value becomes sufficiently small with respect to a sensing characteristic of the driver, the driver stops pressure addition to the brake and starts maintaining brake pressure, while when relative velocity becomes sufficiently small with respect to the sensing characteristic of the driver, the driver releases the brake so as to reduce brake pressure. This is nothing other than the driver using relative acceleration as a control target during emergency deceleration control. In addition, the fact that the driver controls relative acceleration so the value becomes sufficiently small at the initial stage of deceleration means that control is performed such that the same deceleration as that of the preceding vehicle is firstly provided to the subject vehicle. With respect to the driver, it can be expected that deceleration will be neither in excess nor in shortage. Incidentally, as shown at point A in FIG. 6B, the fact that brake pressure is not subjected to pressure reduction even when relative acceleration becomes sufficiently small indicates that the control target has transferred to relative velocity.

The first invention has been made taking note of the fact that the actual driver determines the control target in accordance with a combination of the distance with respect to the object such as the preceding vehicle, the obstacle and the like, relative velocity and relative acceleration, among which the relative acceleration of the subject vehicle with respect to the object such as the preceding vehicle, the obstacle and the like has the highest priority, and control is performed such that deceleration is immediately started when relative acceleration is large even if relative velocity is small.

The relative acceleration detecting means of the first invention detects the relative acceleration of the subject vehicle with respect to the object such as the preceding vehicle, the obstacle and the like. In order to detect relative acceleration, it is also acceptable that the distance between the preceding vehicle and the object is detected, and this distance is differentiated by time twice to determine relative acceleration, or it is also possible that relative velocity between the subject vehicle and the object is detected, and this relative velocity is differentiated by time to detect relative acceleration. The judging means judges whether or not the subject vehicle and the object relatively approach at a relative acceleration that is not less than the predetermined value. The control means controls vehicle velocity such that relative acceleration becomes not more than the predetermined target relative acceleration when the subject vehicle and the object relatively approach at a relative acceleration that is not less than the predetermined value.

In the first invention, vehicle velocity is controlled using relative acceleration which is used as the control target by the driver during emergency deceleration, so that the driver feels the timing of the start of deceleration to be adequate. It is thereby possible to sensitively respond to a rapid change in the object, for example, a rapid change in the running state of the preceding vehicle, and a rapid change such as an obstacle suddenly falling in front of the subject vehicle and the like. In addition, because relative acceleration is used as the control target, it is possible to perform an act of deceleration that is equivalent to the act of deceleration of the preceding vehicle, which is different from the prior art where the target distance between vehicles is corrected and changed.

In addition, in the first invention, it is possible to immediately respond to the rapid approach of the object by preferentially performing control on relative acceleration, and if relative velocity is controlled after relative acceleration is controlled so as to be not more than the target acceleration, then excessive rapid decelerating is not unnecessarily provided, and it becomes possible to give a feeling of adequate deceleration to the driver. Further, if the distance with respect to the object is controlled after relative velocity is controlled to be the target relative velocity, then it is possible to ensure that the subject vehicle does not collide with the object.

As explained above, according to the first invention, vehicle velocity is controlled on the basis of relative acceleration, so that the driver feels that the start of deceleration is adequate.

Next, the principles of the second and third inventions are explained. FIG. 7 shows a relationship between the time period after the preceding vehicle starts its approach until the following vehicle (subject vehicle) starts decelerating and the relative acceleration between the preceding vehicle and the subject vehicle. As understood from FIG. 7, the driver only takes his foot off an accelerator pedal (letting off the throttle) when the relative acceleration is small, and does not step on the brake pedal (brake operation); provides a period for gradual deceleration by means of engine braking, and observes the situation for a short while and avoids unnecessary braking.

In such a manner, the deceleration by engine braking is performed in spite that relative acceleration is small, when the risk of colliding with the preceding vehicle is relatively high such that relative velocity is high, the distance between vehicles becomes short or the like. And when the risk is not reduced, even if deceleration by engine braking is performed, deceleration is conducted by operating the brake. Therefore, when relative acceleration is small, the time t after the throttle is released and engine braking is operated until the brake is operated is long. On the contrary, when relative acceleration is large, the letting off of the throttle and the brake operation are immediately performed as a series of actions, so that time t is short.

Taking such a deceleration operation by the driver into consideration, in the second invention, the distance, relative velocity and relative acceleration between the subject vehicle and the object such as the preceding vehicle, an obstacle on a running road and the like are detected, and the subject vehicle decelerates if relative acceleration between the subject vehicle and the object is less than the predetermined value, the distance between the subject vehicle and the object is less than the first predetermined value and not less than the second predetermined value which is smaller than the first predetermined value, and the subject vehicle and the object relatively approach at the relative velocity not less than the predetermined value, and if relative acceleration between the subject vehicle and the object is less than the predetermined value, and the distance between the subject vehicle and the object is less than the third predetermined value which is smaller than said first predetermined value and larger than the second predetermined value, and not less than the second predetermined value.

In such a manner, when relative velocity is large even if relative acceleration with respect to the object is small, or when the distance is comparatively small even if relative acceleration with respect to the object is small, then the risk of colliding with the object is comparatively high, and it is necessary to decelerate by means of engine braking and the like in the same manner as the deceleration operation by the driver. The subject vehicle is decelerated in the above-mentioned case in the second invention, so that the timing of deceleration is adequate timing without giving the driver a sense of incongruity when the preceding vehicle is gradually decelerating and the like. Incidentally, with respect to deceleration in this case, it is preferable to apply, for example, deceleration by engine braking, deceleration by exhaust braking, deceleration by down shifting and the like, so as to perform gradual deceleration to allow the deceleration to be less than a predetermined value.

In addition, in the third invention, the distance, relative velocity and relative acceleration between the subject vehicle and the object are detected, and the subject vehicle is decelerated at a deceleration not less than the predetermined value if the distance between the subject vehicle and the object is less than the first predetermined value, and the subject vehicle and the object relatively approach at relative acceleration not less than the predetermined value, and if the distance between the subject vehicle and the object is less than the second predetermined value which is smaller than said first predetermined value, and the subject vehicle is decelerated at a deceleration less than the predetermined value if the relative acceleration between the subject vehicle and the object is less than the predetermined value, the distance between the subject vehicle and the object is less than said first predetermined value and not less than said second predetermined value, and the subject vehicle and the object relatively approach at a relative velocity not less than the predetermined value, and if relative acceleration between the subject vehicle and the object is less than the predetermined value, and the distance between the subject vehicle and the object is less than the third predetermined value which is smaller than said first predetermined value and larger than said second predetermined value, and not less than said second predetermined value.

Accordingly, for example, when the preceding vehicle rapidly decelerates, the subject vehicle and the object such as the preceding vehicle, the obstacle and the like relatively approach at an acceleration not less than the predetermined value, and the risk of colliding with the object is high. However, if the distance between the subject vehicle and the object is less than the first predetermined value, then the deceleration of the subject vehicle is performed at a deceleration not less than the predetermined value. In addition, even if relative acceleration with respect to the object is small, if the distance between the subject vehicle and the object is fairly small, then the risk of colliding with the object is high. However, also in such a case (a case in which the distance with respect to the object is less than the second predetermined value), the deceleration of the subject vehicle is performed at a deceleration not less than the predetermined value. Incidentally, with respect to the deceleration at a deceleration not less than the predetermined value, for example, it is possible to decelerate by controlling the brake pressure of a brake apparatus. In this way, deceleration is performed when relative acceleration is not less than the predetermined value, so that as compared with a case in which deceleration is performed in accordance with the distance between vehicles and the relative velocity as in the prior art, deceleration is performed at an adequate timing, namely rapidly in a case in which the preceding vehicle rapidly decelerates and the like. In addition, the deceleration is performed when the distance with respect to the object becomes fairly small and the risk of collision becomes high, so that the collision of the subject vehicle with the object is prevented.

Further, the subject vehicle is decelerated at the deceleration less than the predetermined value if relative acceleration between the subject vehicle and the object is less than the predetermined value, the distance between the subject vehicle and the object is less than the first predetermined value and not less than the second predetermined value, and the subject vehicle and the object relatively approach at relative velocity not less than the predetermined value, and if relative acceleration between the subject vehicle and the object is less than the predetermined value, and the distance between the subject vehicle and the object is less than the third predetermined value which is smaller than the first predetermined value and larger than the second predetermined value, and not less than the second predetermined value, so that in the same manner as the invention defined in claim 1, the deceleration is performed at an adequate deceleration and an adequate timing without giving the driver a sense of incongruity even when the preceding vehicle gradually decelerates.

As explained above, in the second invention, the distance, relative velocity and relative acceleration between the subject vehicle and the object such as the preceding vehicle, the obstacle on a running road and the like are detected, and the subject vehicle is decelerated if relative acceleration between the subject vehicle and the object is less than the predetermined value, the distance between the subject vehicle and the object is less than the first predetermined value and not less than the second predetermined value which is smaller than the first predetermined value, and the subject vehicle and the object relatively approach at relative velocity not less than the predetermined value, and if relative acceleration between the subject vehicle and the object is less than the predetermined value, and the distance between the subject vehicle and the object is less than the third predetermined value which is smaller than the first predetermined value and larger than the second predetermined value, and not less than the second predetermined value, so that an excellent effect is obtained in that deceleration can be performed at an adequate timing without giving the driver a sense of incongruity.

In the third invention, the distance, relative velocity and relative acceleration between the subject vehicle and the object are detected, and the subject vehicle is decelerated at a deceleration not less than the predetermined value if the distance between the subject vehicle and the object is less than the first predetermined value, and the subject vehicle and the object relatively approach at relative acceleration not less than the predetermined value, and if the distance between the subject vehicle and the object is less than the second predetermined value which is smaller than the first predetermined value, and the subject vehicle is decelerated at a deceleration less than the predetermined value if relative acceleration between the subject vehicle and the object is less than the predetermined value, the distance between the subject vehicle and the object is less than the first predetermined value and not less than the second predetermined value, and the subject vehicle and the object relatively approach at relative velocity not less than the predetermined value, and if relative acceleration between the subject vehicle and the object is less than the predetermined value, and the distance between the subject vehicle and the object is less than the third predetermined value which is smaller than the first predetermined value and larger than the second predetermined value, and not less than the second predetermined value, so that an excellent effect is obtained in that deceleration can be performed at an adequate deceleration and an adequate timing without giving the driver a sense of incongruity.

Finally, the principles of the fourth and fifth inventions are explained. As explained in FIG. 7, when relative acceleration is small, the time t after the throttle has been released and engine braking is operated until the brake is operated becomes long, whereas when relative acceleration is large, letting off the throttle and the brake operation are immediately performed as a series of actions, so that the time t becomes short.

In addition, as explained in FIGS. 5A and 5B, the driver immediately starts the act of deceleration when relative acceleration is large even if relative velocity is small.

And as explained in FIGS. 6A and 6B, the driver uses relative acceleration as the control target during emergency deceleration control.

Taking such deceleration operation by the driver into consideration, in the fourth invention, the relative acceleration of the subject vehicle with respect to the object such as the preceding vehicle, the obstacle and the like and the distance between the subject vehicle and the object are detected, and it is judged whether or not the deceleration by the brake operation is performed, and the alarm is generated if it is judged that the subject vehicle and the object relatively approach at relative acceleration not less than the predetermined value, the distance between the subject vehicle and the object is not more than the predetermined value, and deceleration by the brake operation is not performed.

Therefore, for example, in such cases in which the preceding vehicle rapidly decelerates, the driver rapidly accelerates the subject vehicle without noticing an obstacle on a running road and the like, the subject vehicle and the object such as the preceding vehicle, the obstacle and the like relatively approach at relative acceleration not less than the predetermined value, the alarm is generated if the distance between the subject vehicle and the object is not more than the predetermined value and the brake operation is not performed, and the driver can immediately perform the brake operation on the basis of this alarm. In such a manner, the alarm is generated in accordance with relative acceleration which is used as the control target by the driver during emergency deceleration, so that the alarm is generated at an adequate timing approximately coinciding with the timing in which the driver performs the brake operation, and the driver is not given a sense of incongruity.

Incidentally, also in the fourth invention, in the same manner as in the prior art, the distance between the subject vehicle and the object is detected, and the alarm is not generated if the distance is larger than the predetermined value, which is due to the fact that there is no danger of immediate collision when the object approaching the subject vehicle at relative acceleration not less than the predetermined value is located in an extremely far-away position, in order that the alarm is not generated unnecessarily. Therefore, the timing for generating the alarm is not caused to greatly differ depending on the large or small magnitude of the threshold value (predetermined value) of the distance as in the prior art.

By the way, even if relative acceleration is less than the predetermined value, for example, in a case in which approach toward the object is made at a constant velocity (the relative acceleration is "0"), in a case in which the distance between vehicles is short although relative acceleration is less than the predetermined value and the like, the risk of colliding with the object is comparatively high. As is also clear from FIG. 7, in ordinary cases (cases in which the driver recognizes the state in which the risk is comparatively high), the deceleration of the vehicle by engine braking is performed.

Thus, in the fifth invention, the relative acceleration of the subject vehicle with respect to the object such as the preceding vehicle, the obstacle and the like, relative velocity between the subject vehicle and the object, and the distance between the subject vehicle and the object are detected, it is judged whether or not the deceleration by engine braking is performed, and the alarm is generated if it is judged that relative acceleration between the subject vehicle and the object is less than the predetermined value, the distance between the subject vehicle and the object is not more than the first predetermined value, the subject vehicle and the object relatively approach at relative velocity not less than the predetermined value, and deceleration by engine braking is not performed, or if it is judged that relative acceleration between the subject vehicle and the object is less than the predetermined value, the distance between the subject vehicle and the object is not more than the second predetermined value which is smaller than the first predetermined value, and deceleration by engine braking is not performed.

Thereby, even if relative acceleration is less than the predetermined value, the alarm is generated in a case in which approach toward the object is made at a comparatively large relative velocity, and in a case in which the distance with respect to the object is comparatively short. Namely, in a case in which the risk of colliding with the object is comparatively high, and it is necessary to decelerate the subject vehicle at least by means of engine braking, so that the alarm can be generated at an adequate timing without giving the driver a sense of incongruity.

As explained above, in the fourth invention, relative acceleration of the subject vehicle with respect to the object such as the preceding vehicle, the obstacle and the like and the distance between the subject vehicle and the object are detected, and it is judged whether or not the deceleration by the braking operation is performed, and the alarm is generated if it is judged that the subject vehicle and the object relatively approach at the relative acceleration not less than the predetermined value, the distance between the subject vehicle and the object is not more than the predetermined value, and deceleration by the braking operation is not performed, so that an excellent effect is obtained in that the alarm can be generated at an adequate timing without giving the driver a sense of incongruity.

In the fifth invention, relative acceleration of the subject vehicle with respect to the object such as the preceding vehicle, the obstacle and the like, relative velocity between the subject vehicle and the object, and the distance between the subject vehicle and the object are detected, it is judged whether or not deceleration by the engine braking is performed, and the alarm is generated if it is judged that relative acceleration between the subject vehicle and the object is less than the predetermined value, the distance between the subject vehicle and the object is not more than the first predetermined value, the subject vehicle and the object relatively approach at relative velocity not less than the predetermined value, and deceleration by engine braking is not performed, or if it is judged that relative acceleration between the subject vehicle and the object is less than the predetermined value, the distance between the subject vehicle and the object is not more than the second predetermined value which is smaller than the first predetermined value, and deceleration by engine braking is not performed, so that an excellent effect is obtained in that the alarm can be generated at an adequate timing without giving the driver a sense of incongruity.

BRIEF DESCRIPTION OF THE DRAWINGS

FIG. 20 is a diagram showing a relation between relative velocity of the preceding vehicle and the correction amount $\Delta L_2$ of the predetermined value $L_2$.

BEST MODE FOR CARRYING OUT THE INVENTION

Figure 1:
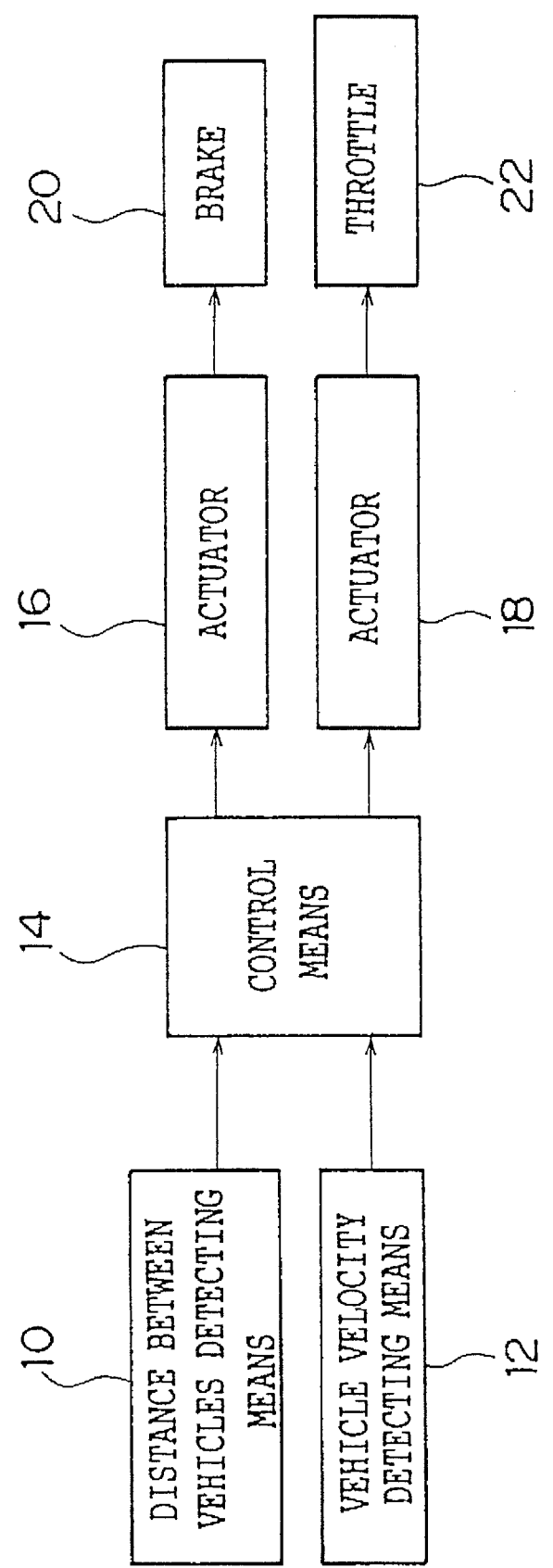
FIG. 1 is a block diagram of a first embodiment of the present invention.

The first embodiment will now be explained in detail with reference to the drawings. In the present embodiment, the present invention is applied to a following running control apparatus for allowing a subject vehicle to run following a preceding vehicle. This following running control apparatus is carried in the vehicle, and is provided with a distance between vehicles detecting means 10 for detecting a distance between the preceding vehicle and the subject vehicle, and a vehicle velocity detecting means 12 for detecting a velocity of the subject vehicle (subject vehicle velocity) as shown in FIG. 1. As the distance between vehicles detecting means 10, a radar range finder can be used. Alternatively, the distance between vehicles may be detected on the basis of the position of the preceding vehicle from an image obtained by photographing the situation in front of the subject vehicle. As the vehicle velocity detecting means 12, a speed sensor attached to the vehicle can be used. The distance between vehicles detecting means 10 and the vehicle velocity detecting means 12 are connected to a control means 14 constituted by a microcomputer which calculates relative velocity and relative acceleration between the preceding vehicle and the subject vehicle, controls brake pressure and the degree to which the throttle opened, and thereby controls subject vehicle velocity. The microcomputer is provided with a CPU, a ROM and a RAM which are not shown. The control means 14 is connected via an actuator 16 to a brake 20 and via an actuator 18 to a throttle 22 all of which are provided in the subject vehicle.

Next, a main routine of the control means 14 is explained with reference to FIG. 2. This main routine is executed when the main switch of the present apparatus is turned on. Incidentally, in the following, with respect to relative velocity and relative acceleration, the direction in which the subject vehicle and the preceding vehicle approach is positive.

In a step 100, present distance between vehicles HW detected by the distance between vehicles detecting means 10 and present subject vehicle velocity detected by the vehicle velocity detecting means 12 are fetched. In step 102 as the relative acceleration detecting means, relative acceleration G and relative velocity V are calculated on the basis of the distance between vehicles HW. In the next step 104, the distance between vehicles HW is compared with a predetermined distance between vehicles for following HW1. When the distance between vehicles HW is larger than the distance between vehicles for following HW1, then the subject vehicle is well separated from the preceding vehicle, so that in step 106, in the same manner as a conventional automatic drive type providing constant vehicle velocity, the degree of opening the throttle 22 is controlled through the actuator 18. Thus, the velocity of the subject vehicle kept constant. On the other hand, when it is judged in step 104 that the distance between vehicles HW is not more than the distance between vehicles for following HW1, then following running control as explained hereinafter is executed.

In step 108, relative acceleration G is compared with a positive predetermined value G1 prescribed beforehand. When relative acceleration G is not more than the predetermined value G1, then in step 110, relative velocity V is compared with a positive predetermined value V1 prescribed beforehand. When it is judged in step 110 that relative velocity V is larger than the predetermined value V1, the routine proceeds to step 112. When relative velocity V is not more than the predetermined value V1, it is judged in step 114 whether or not a difference ΔHW between a reference value prescribed in accordance with subject vehicle velocity and the present distance between vehicles HW is smaller than a predetermined value HWc prescribed in accordance with the reference value. The routine proceeds to step 116 when the difference ΔHW is smaller than the predetermined value HWc. In the step 116, the distance between vehicles with respect to the preceding vehicle is used as a control target, and subject vehicle velocity is controlled to provide a distance between vehicles corresponding to the reference value in accordance with the subject vehicle velocity. However, at this time there is no braking control. Subject vehicle velocity is controlled by controlling the degree in which the throttle is opened. On the other hand, the routine proceeds to step 112 when the difference ΔHW is not less than the predetermined value HWc.

In the step 112, according to a table which determines a relation between subject vehicle velocity, relative velocity V and the distance between vehicles for starting deceleration Ldm stored beforehand in the ROM, distance between vehicles for starting deceleration Ldm in accordance with subject vehicle velocity and relative velocity V is calculated. In step 118, the distance between vehicles for starting deceleration Ldm is compared with the present distance between vehicles HW. When the distance between vehicles for starting deceleration Ldm is not more than the present distance between vehicles HW, then the control of the degree in which the throttle throttle is opened is performed in step 120. Thus engine braking is executed to allow gradual deceleration. Incidentally, for gradual deceleration, it is also possible to hold open the present degree of throttle. It is also acceptable to combine the degree of holding open the throttle with the gradual deceleration control in accordance with the magnitude of the distance between vehicles for starting deceleration Ldm.

When it is judged in step 118 that the distance between vehicles for starting deceleration Ldm is larger than the present distance between vehicles HW, then a distance between vehicles in accordance with subject vehicle velocity is used as the control target in a step 122, and control of deceleration is performed with respect to the gradual approach of the preceding vehicle. However, at this time the throttle valve is in a fully closed state, and adjustment of deceleration is carried out by the braking operation only. Different from the control of the distance between vehicles in the step 116, the degree of deceleration at this time is preferably set at a value having an increment of 40–60% with respect to the degree of deceleration degree in step 116. This is due to the fact that the control target used in the control of the distance between vehicles in the step 116 is an ideal distance between vehicles which is felt to be optimal by the driver during following running, while the control target used in step 122 is a boundary distance between vehicles in which further approach is not desired by the driver.

When it is judged in step 108 that relative acceleration G is larger than the predetermined value G1, then deceleration control is performed in step 124.

Figure 3:
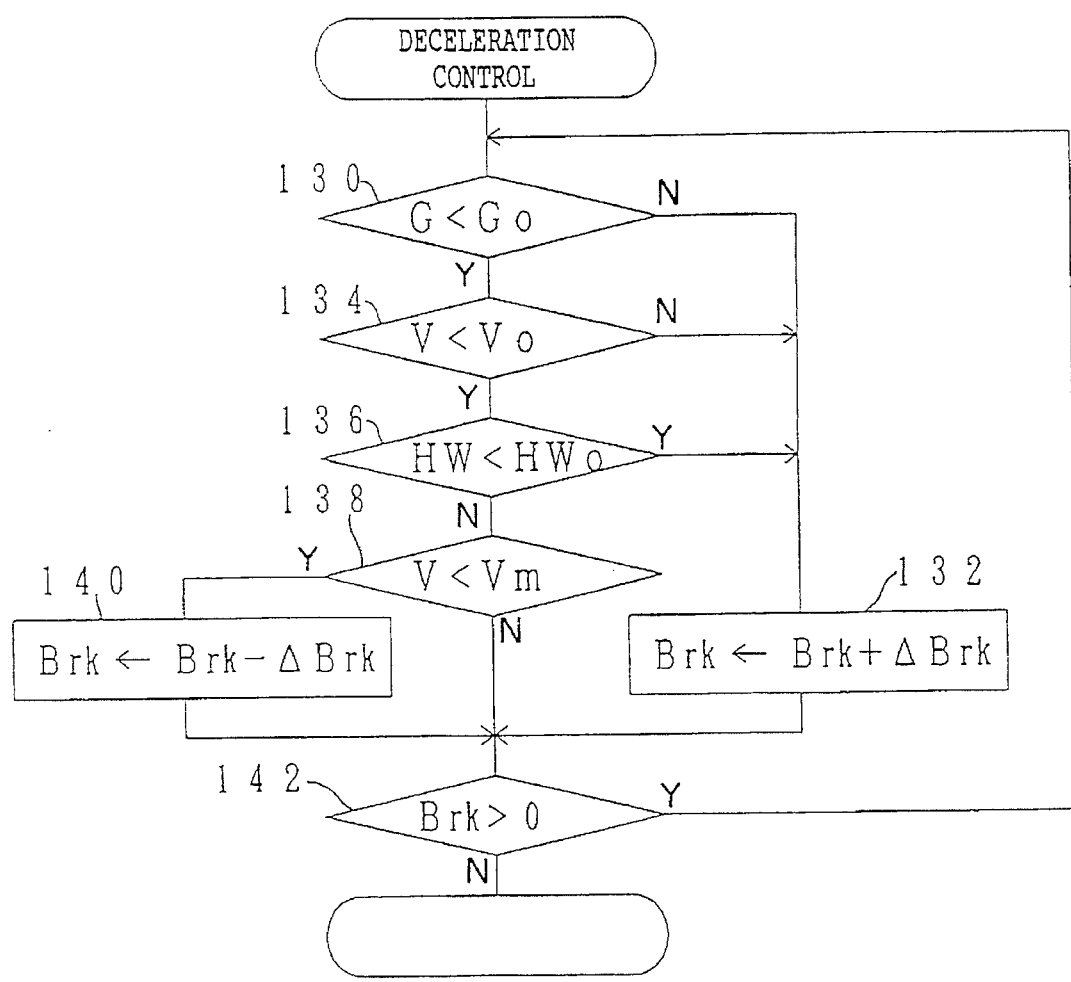
FIG. 3 is a flow chart showing details of step 124 in FIG. 2.
Figure 4:
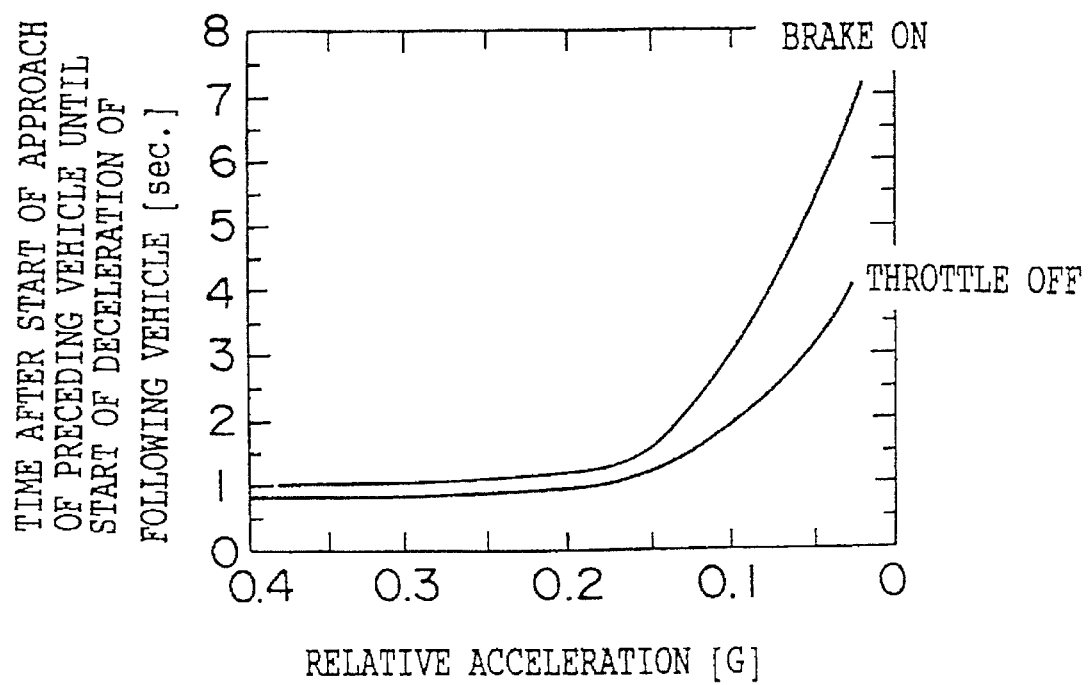
FIG. 4 is a diagram showing a relation between the time until the subject vehicle starts deceleration and relative acceleration.
Figure 5:
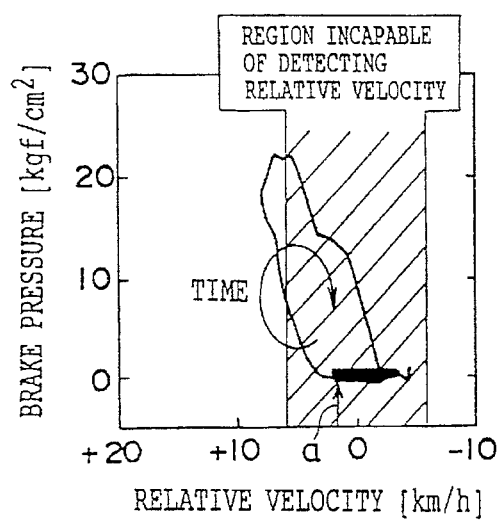
FIGS. 5A and 5B are diagrams showing relations between brake pressure and relative velocity, and between brake pressure and relative acceleration, respectively.
Figure 5:
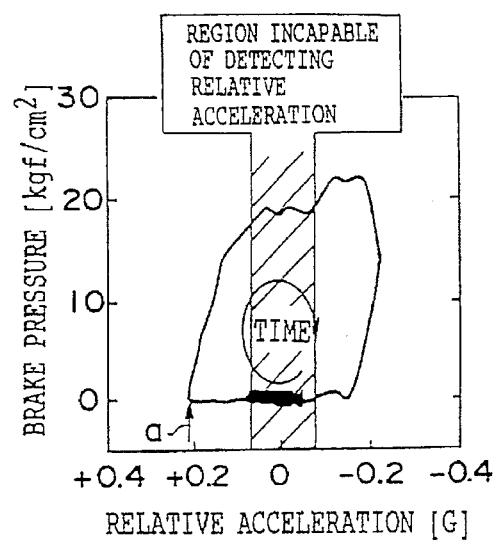
Figure 6:
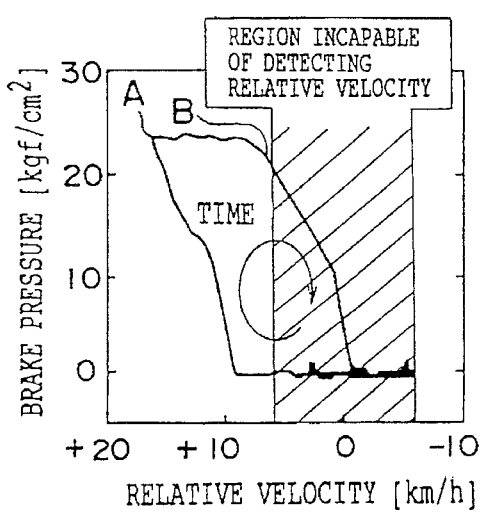
FIGS. 6A and 6B are diagrams showing relations between brake pressure and relative velocity, and between brake pressure and relative acceleration, respectively.
Figure 6:
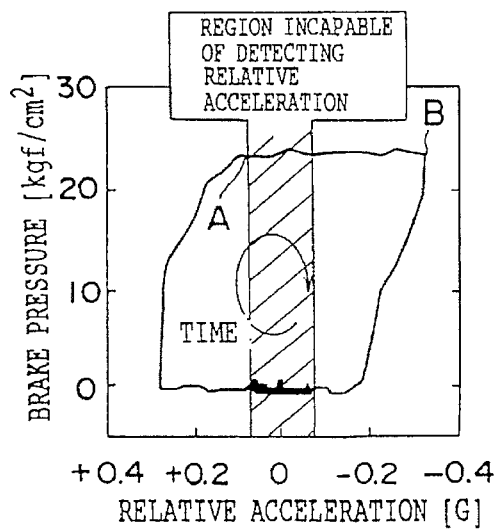
Figure 7:
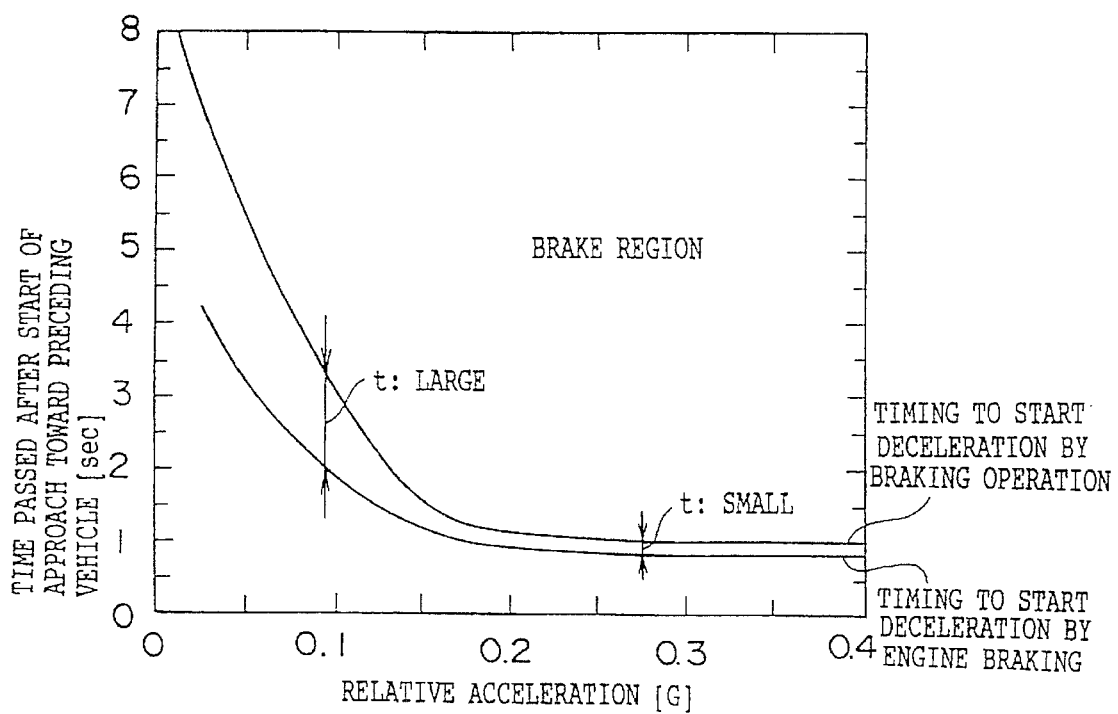
FIG. 7 is a diagram showing relations between relative acceleration with respect to an object and timings to start deceleration by engine braking and a foot braking operation.

This deceleration control will now be explained in detail on the basis of FIG. 3. In step 130, relative acceleration G is compared with a predetermined value $G_0$ which is a sufficiently small positive value prescribed beforehand. This predetermined value $G_0$ is smaller than the predetermined value G1. When relative acceleration G is not less than the predetermined value $G_0$, the routine proceeds to step 132. If relative acceleration G is smaller than the predetermined value $G_0$, then relative velocity V is compared in step 134 with a predetermined value $V_0$ which is a sufficiently small positive value prescribed beforehand. When relative velocity V is not less than the predetermined value $V_0$, the routine proceeds to step 132. If relative velocity V is smaller than the predetermined value $V_0$, then the distance between vehicles HW is compared in step 136 with a necessary minimum safe distance between vehicles $HW_0$ prescribed beforehand. In this case, the reasons why the distance between vehicles HW is compared with the safe distance between vehicles $HW_0$ are that it cannot be asserted that there is no possibility of a collision with the preceding vehicle by only controlling relative velocity V, and to further guarantee safety. When the distance between vehicles HW is smaller than the safe distance between vehicles $HW_0$ in step 136, the routine proceeds to step 132. If the distance between vehicles HW is not less than the safe distance between vehicles $HW_0$, the routine proceeds to step 138, where relative velocity V is compared with a predetermined value Vm ($<V_0$) which is a negative predetermined value which has an absolute value that is sufficiently small and has been prescribed beforehand. When relative velocity V is smaller than the predetermined value Vm, the routine proceeds to step 140. If relative velocity V is not less than the predetermined value Vm, the routine proceeds to step 142. In step 132, a value in which a predetermined value ΔBrk is added to present brake pressure Brk is used as a new brake pressure Brk to control the brake 20 via the actuator 16, thereby subjecting brake pressure Brk to pressure addition. As a result, if the relative acceleration G is not less than the predetermined value $G_0$, if relative velocity V is not less than the predetermined value $V_0$, or if the distance between vehicles HW is smaller than the safe distance between vehicles $HW_0$, then brake pressure Brk is subjected to pressure addition, and deceleration is achieved.

On the other hand, in step 140, a value in which the predetermined value ΔBrk is subtracted from the present brake pressure Brk is used as a new brake pressure Brk to control the brake 20 via the actuator 16, thereby subjecting the brake pressure Brk to pressure reduction. As a result, if relative acceleration G is smaller than the predetermined value $G_0$, relative velocity V is smaller than the predetermined value $V_0$, the distance between vehicles HW is not less than the safe distance between vehicles $HW_0$, relative velocity V is smaller than the predetermined value Vm, and the subject vehicle and the preceding vehicle move far apart, then the brake pressure Brk is subjected to pressure reduction. In the step 142, it is judged whether or not brake pressure Brk is positive, and if it is positive, then the routine returns to step 130. If brake pressure Brk is not more than 0, the routine ends. In addition, if relative acceleration G is smaller than the predetermined value $G_0$, relative velocity V is smaller than the predetermined value $V_0$, the distance between vehicles HW is not less than the safe distance between vehicles $HW_0$, and relative velocity V is not less than the predetermined value Vm, then brake pressure Brk is maintained.

As described above, an example was given in which a microcomputer is used as the control means 14. However, instead of a microcomputer, a neural network comprising an input layer, an intermediate layer and an output layer may be also used. In this case, neural network is constituted such that each data regarding relative acceleration, relative velocity, the distance between vehicles and subject vehicle velocity is inputted into each neuron of the input layer, and control targets are outputted from the output layer. It is judged what control targets are adopted by the driver at each point in time according to operation amounts of the throttle and the brake by the driver when the control of the present apparatus is not operating (when the main switch is turned OFF) so as to provide model outputs. Relative acceleration, relative velocity, the distance between vehicles and the vehicle velocity are used as inputs to allow the neural network to learn. Regarding output, it is possible to select cases in which the throttle opening degree is adjusted (step 116 in FIG. 2), both the throttle opening degree and brake pressure are 0 (step 120 in FIG. 2), the distance between vehicles is controlled to be in the vicinity of a value in accordance with vehicle velocity by the braking operation of the driver (step 122 in FIG. 2), and in the case where a braking operation other than the above is performed (step 124 in FIG. 2). In this neural network, one output may be used to output four kinds of values, or two outputs may be used to indicate the presence or absence of the output allocating 0, 1 to 2 bit output terminals. In addition, four outputs may be used to select one of them.

Next, the second embodiment is explained. In the present embodiment, these inventions are applied to a following running control apparatus. This following running control apparatus is carried in a vehicle which is not shown, and has the same constitution as that in FIG. 1. Therefore, explanation will be omitted.

Figure 8:
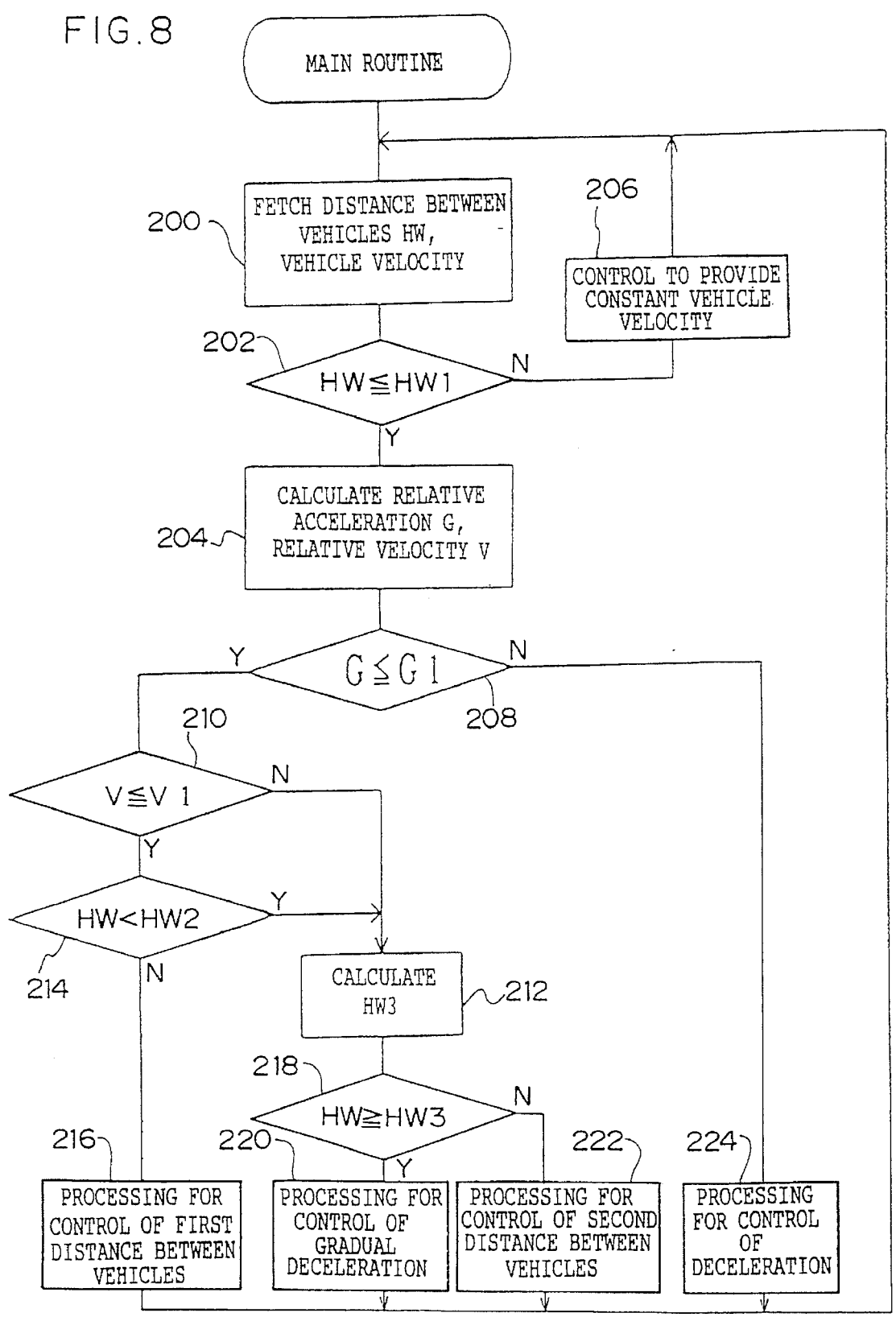
FIG. 8 is a flow chart showing a main routine of a second embodiment.

Next, with reference to FIG. 8, a main routine of the control means 14 will be explained. This main routine is executed when a main switch of the present apparatus is turned on. Incidentally, in the following, with respect to relative velocity and relative acceleration, a direction in which the subject vehicle and a preceding vehicle approach is positive.

Figure 2:
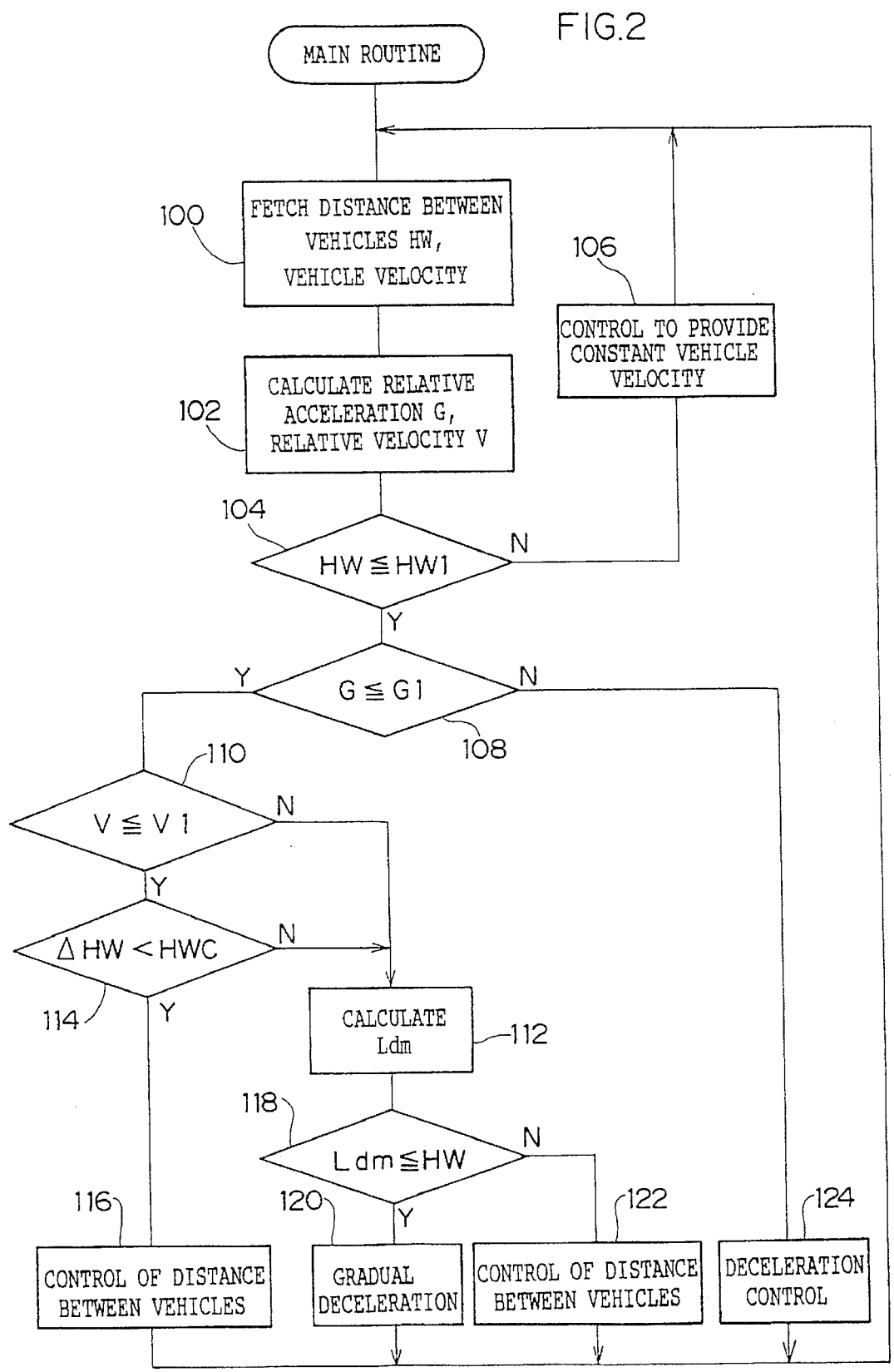
FIG. 2 is a flow chart showing a main routine of the first embodiment.

In step 200, in the same manner as in step 100 in FIG. 2, present distance between vehicles HW and present subject vehicle velocity $V_x$ are fetched. In the next step 202, the distance between vehicles HW is compared with distance between vehicles for following HW1 which is prescribed beforehand as the first predetermined value of the second and third inventions. The distance between vehicles for following HW1 is a reference value corresponding to a threshold value of the distance between vehicles to enter a state in which the subject vehicle performs following running with respect to the preceding vehicle. This threshold value changes in accordance with the vehicle velocity of the subject vehicle, so that the distance between vehicles for following HW1 is set on the basis of a predetermined relation between vehicle velocity $V_x$ and the distance between vehicles for following HW1 (see FIG. 9 as one example), and the value is changed in accordance with the vehicle velocity $V_x$. In the example in FIG. 9, the distance between vehicles for following HW1 is determined to be in proportion to vehicle velocity $V_x$.

If the distance between vehicles HW is not less than the distance between vehicles for following HW1, then the subject vehicle is separated from the preceding vehicle by a proper degree, so that in step 206, in the same manner as a conventional automatic drive type providing constant vehicle velocity, the degree to which the throttle 22 is opened is controlled via the actuator 18, and thereby controls subject vehicle velocity $V_x$ to be constant. On the other hand, when it is judged in step 202 that the distance between vehicles HW is smaller than the distance between vehicles for following HW1, in step 204 relative acceleration G and relative velocity V are calculated on the basis of the distance between vehicles HW. In the next step 208 and steps thereafter, following running control is performed.

In step 208, relative acceleration G is compared with a positive predetermined value G1 prescribed beforehand. Incidentally, the predetermined value G1 is determined on the basis of a minimum value of relative acceleration which a driver is capable of sensing. If relative acceleration G is smaller than the predetermined value G1, then relative velocity V is compared in step 210 with a positive predetermined value V1 prescribed beforehand. Incidentally, the predetermined value V1 is determined on the basis of a minimum value of relative velocity which a driver is capable of sensing. As one example, a value of about 5–10 km/hr is set. If it is judged in step 210 that relative velocity V is larger than the predetermined value V1, the routine goes to step 212.

On the other hand, if relative velocity V is not more than the predetermined value V1, it is judged in step 214 whether or not the distance between vehicles HW is smaller than a predetermined value HW2 as the third predetermined value in the second and third inventions. Incidentally, the predetermined value HW2 is a value smaller than the above-mentioned distance between vehicles for following HW1, which is set in accordance with the following equation (1):

$$HW1 - HW2 = K \cdot HW1 \tag{1}$$

However, K is a proportional constant corresponding to a minimum value of a variation in the distance between vehicles which a driver is capable of sensing. It is generally known that the minimum value variation of the distance between vehicles capable of being sensed by the driver is about 5–20% of an original distance between vehicles. A value within a range of 0.05<K<0.2 is set for the proportional constant K. For example, when the distance between vehicles for following HW1 is 30 m, the minimum value of the distance between vehicles capable of being sensed by the driver is about 1.5–6 m. Therefore, a value of about 24–28.5 m is set for the predetermined value HW2.

If the distance between vehicles HW is not less than the predetermined value HW2, the routine moves on to step 216.

In step 216, the distance between vehicles with respect to the preceding vehicle is used as a control target, and first processing for control of the distance between vehicles is performed in which subject vehicle velocity is controlled to provide a distance between vehicles corresponding to a reference value in accordance with subject vehicle velocity $V_x$. As this reference value, for example, a value which is larger than the distance between vehicles for following HW by not less than a predetermined value can be set. However, in the first processing for control of the distance between vehicles, control of the brake pressure of the braking apparatus is not performed. Only control of the degree to which the throttle is opened is executed so that subject vehicle velocity is controlled by means of engine braking. If the distance between vehicles HW is smaller than the predetermined value HW2, the routine proceeds to step 212.

Figure 10:
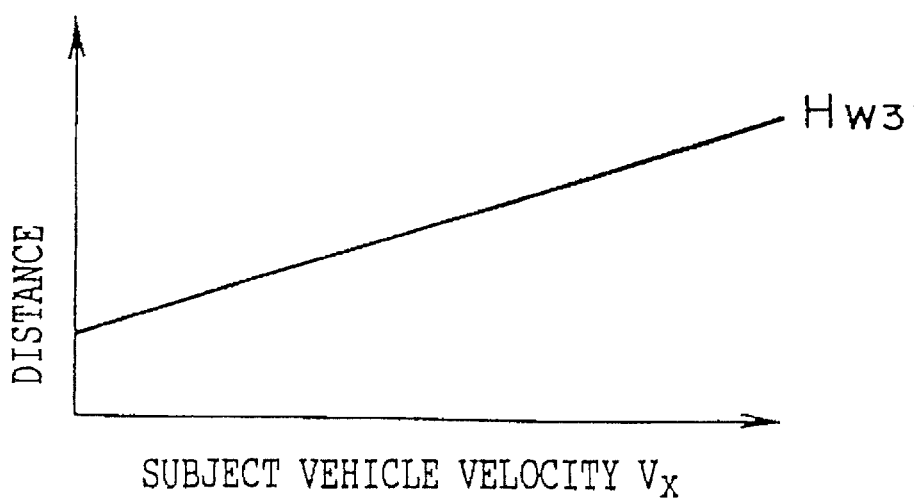
FIG. 10 is a diagram showing a relation between subject vehicle velocity and the distance between vehicles for starting deceleration HW3.

In step 212, a distance between vehicles for starting deceleration HW3 as the second predetermined value in the third invention is calculated. The distance between vehicles for starting deceleration HW3 is a reference value corresponding to a boundary value of the distance between vehicles in which the driver defers brake operation, which is a value smaller than the predetermined value HW2 (namely, HW1>HW2>HW3). The distance between vehicles for starting deceleration also changes in accordance with subject vehicle velocity and the like, so that the distance between vehicles for starting deceleration HW3 is set on the basis of a relation between vehicle velocity $V_x$ and the distance between vehicles for starting deceleration HW3 (see FIG. 10 as one example) determined beforehand by taking into consideration the risk of a collision when the preceding vehicle approaches and is stored in ROM, the value of which is changed in accordance with the vehicle velocity $V_x$. In FIG. 10, this distance between vehicles for starting deceleration HW3 is determined to be in proportion to vehicle velocity $V_x$.

In next step 218, the distance between vehicles for starting deceleration HW3 is compared with the present distance between vehicles HW. Judgment in step 218 is carried out when judgment in step 210 is not affirmed, that is, a case in which the approach of the preceding vehicle is made at a relative velocity not less than the predetermined value V1 although relative acceleration G with respect to the preceding vehicle is smaller than the predetermined value G1, or a case in which judgment in step 214 is affirmed, that is, a case in which the distance between vehicles HW is smaller than the predetermined value HW2, and in such cases, it can be judged that there is a state in which it is necessary to decelerate vehicle velocity at least by means of the engine braking.

Thus, when the present distance between vehicles HW is not less than the distance between vehicles for starting deceleration HW3, the control of the degree to which the throttle is opened is performed in step 220 so that gradual deceleration control processing, in which deceleration is performed at a rate that is less than a predetermined value by means of the engine braking, is carried out. Incidentally, in this gradual deceleration control processing, it is also acceptable for the present degree to which the throttle maintained to be opened. It is also acceptable to combine the throttle opening degree with the control of gradual deceleration in accordance with the magnitude of the distance between vehicles for starting deceleration HW3.

If it is judged in step 218 that the present distance between vehicles HW is smaller than the distance between vehicles for starting deceleration HW3, then it can be judged that the distance between vehicles HW is rather small although relative acceleration with respect to the preceding vehicle is smaller than the predetermined value G1, and that deceleration by the engine braking is insufficient. Thus in step 222, with respect to the gradual approach of the preceding vehicle, second processing for control of the distance between vehicles is performed in which deceleration is performed using the distance between vehicles in accordance with subject vehicle velocity as a control target. However, at this time the throttle is held in a fully closed state, and deceleration is performed by controlling brake pressure. In addition, it is preferable that the deceleration at this time be set at a value having an increment of 40–60% with respect to deceleration in step 216, which is different from the first processing for control of the distance between vehicles in step 216.

On the other hand, when it is judged in step 208 that relative acceleration G is not less than the predetermined value G1, it can be judged that the subject vehicle and the preceding vehicle are in a state of relative approach through large relative acceleration, and it is necessary to immediately operate the brake. Thus, processing for control of deceleration is performed in step 224. This processing for control of deceleration is done in the same manner as the above-mentioned routine in FIG. 3.

Figure 11:
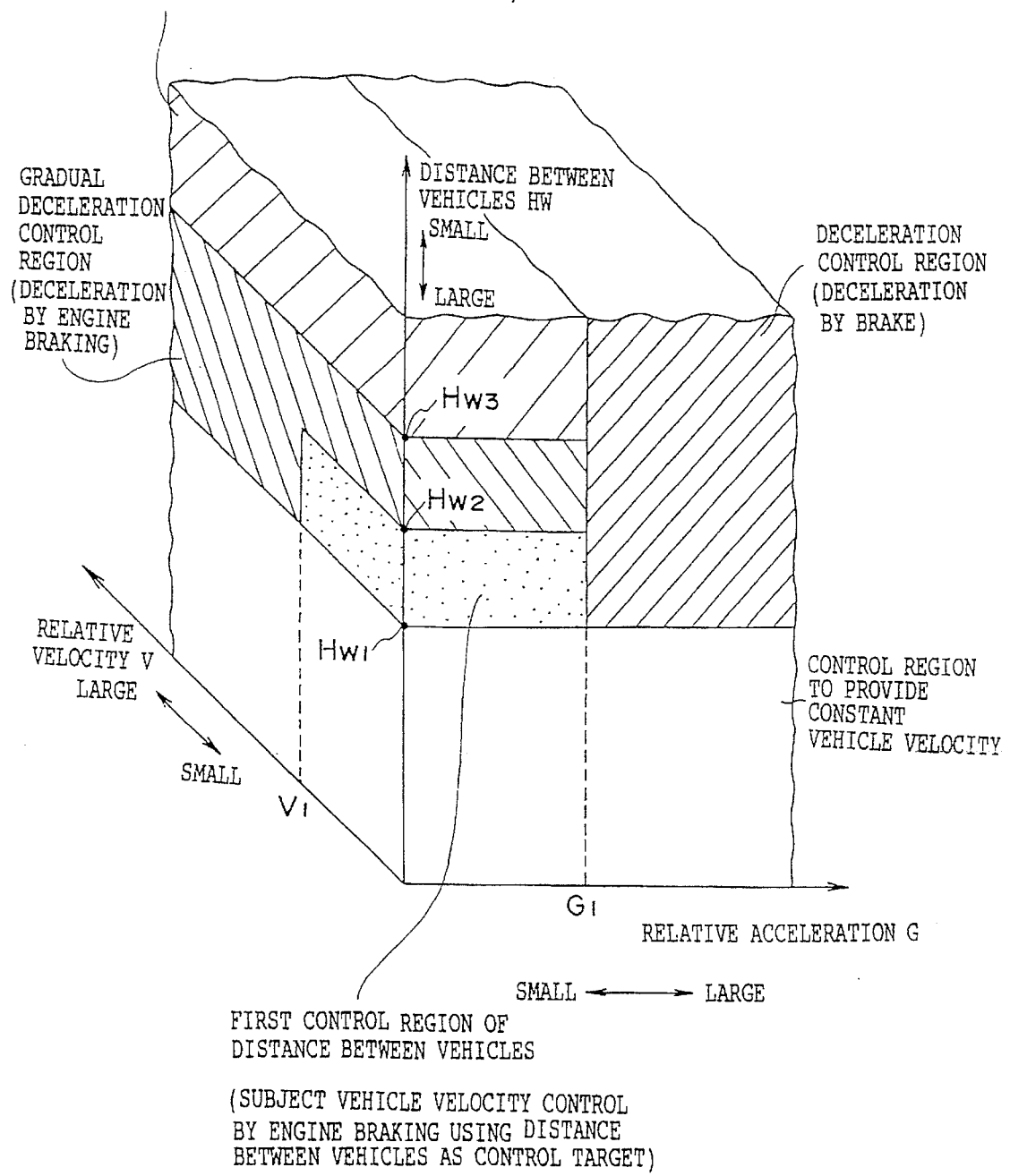
FIG. 11 is a figure conceptually illustrating a relation between deceleration control and the distance between vehicles HW, relative velocity V and relative acceleration G.

The relation between the deceleration control and the distance between vehicles HW, relative velocity V and relative acceleration G as explained above is illustratively shown in FIG. 11. Incidentally, the magnitude of the distance between vehicles for following HW1, the predetermined value HW2 and the distance between vehicles for starting deceleration HW3 changes in accordance with vehicle velocity $V_x$ as described above. In FIG. 11, a region in which the distance between vehicles HW is smaller than the distance between vehicles for following HW1 (region comprising a first control region of the distance between vehicles, a gradual deceleration control region, a second control region of the distance between vehicles and a deceleration control region) is a region in which it is postulated that the driver performs driving in which vehicle velocity is controlled in accordance with the distance between vehicles with respect to the preceding vehicle, wherein deceleration control by engine braking is performed in the "first control region of the distance between vehicles" and the "gradual deceleration control region", and deceleration control by adjusting brake pressure is performed in the "second control region of the distance between vehicles" and the "deceleration control region".

Figure 9:
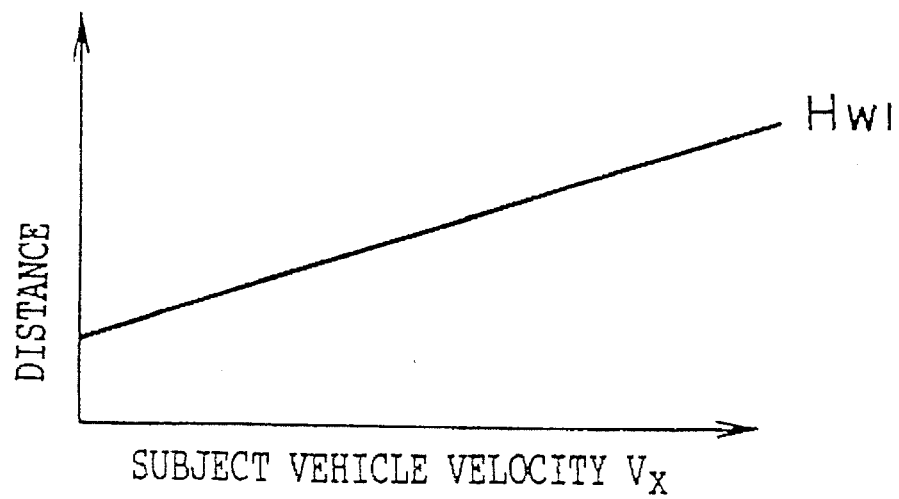
FIG. 9 is a diagram showing a relation between subject vehicle velocity and the following distance between vehicles HW1 as a reference value of the distance between vehicles.

Incidentally, in the present embodiment, upon setting the value of the distance between vehicles for following HW1, a relationship has been used in which the distance between vehicles for following HW1 changes linearly with respect to vehicle velocity $V_x$ as shown in FIG. 9. However, there is no limitation thereto. For example, the value may be set using a relationship in which the distance between vehicles for following HW1 simply increases and changes in a curved manner with respect to an increase in vehicle velocity $V_x$. In addition, the distance between vehicles for following HW1 determined by using the relationship as described above, may be corrected in accordance with, for example, an average distance between vehicles in the past and the like.

Also with respect to the distance between vehicles for starting deceleration HW3, there is no limitation to the setting of the value using the relation shown in FIG. 10, and in the same manner as described above, the value may be set using a relationship in which the distance between vehicles for starting deceleration HW3 simply increases and changes in a curved manner with respect to an increase in the vehicle velocity $V_x$. In addition, it is also acceptable for the value of the distance between vehicles for starting deceleration HW3 be corrected in accordance with relative velocity V. Namely, determination may be made in accordance with the following equation (2):

$$HW3m=HW3+\Delta HW3 \qquad (2)$$

Figure 12:
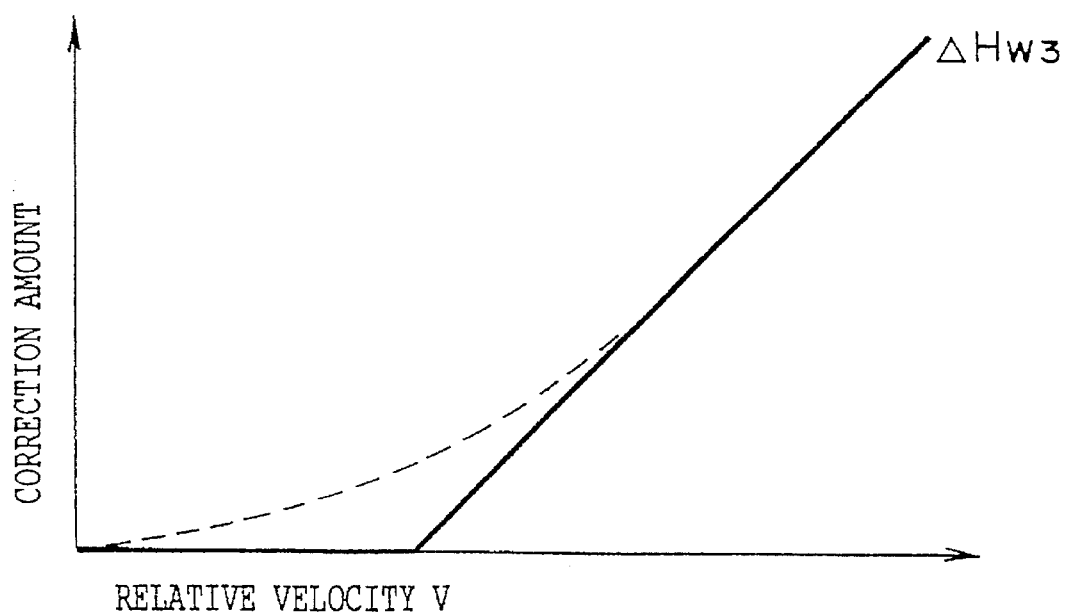
FIG. 12 is a diagram showing a relation between relative velocity of the preceding vehicle and the correction amount ΔHW3 of the distance between vehicles for starting deceleration HW3.

However, HW3m is a value after correction, and $\Delta HW3$ is a correction value. It is also possible to perform judgment in the above-mentioned step 218 by using the value HW3m after correction. The correction value $\Delta HW3$ can be determined by using relationships between relative velocity V and the correction value $\Delta HW3$ as shown by the solid line or the broken line in FIG. 12 as one example. Incidentally, the relationship shown in FIG. 12 by the solid line is one in which the change in interval in which the driver feels that rapid deceleration is necessary is expressed as the correction amount $\Delta HW3$ with respect to the change in relative velocity V. In addition, it is needless to say that the distance between vehicles for starting deceleration HW3 in the equation (2) is allowed to have its value which may be changed in accordance with vehicle velocity $V_x$ on the basis of the relation shown in FIG. 10 and the like.

Further, the boundary value of the distance between vehicles in which the driver defers the braking operation also changes depending on surrounding circumstances such as how crowded circumstance the running road is, average flow velocity of vehicles on the running road and the like, and for example, on a crowded expressway, the above-mentioned boundary value of the vehicle running at 100 km/hr sometimes becomes about 10 m. Thus, also with respect to the above-mentioned distance between vehicles for starting deceleration HW3, the value may be further corrected in accordance with the surrounding circumstances.

Also, the predetermined value G1 of relative acceleration and the predetermined value V1 of relative velocity, may be corrected in accordance with an average distance between vehicles, average velocity of the subject vehicle and the like.

Figure 13:
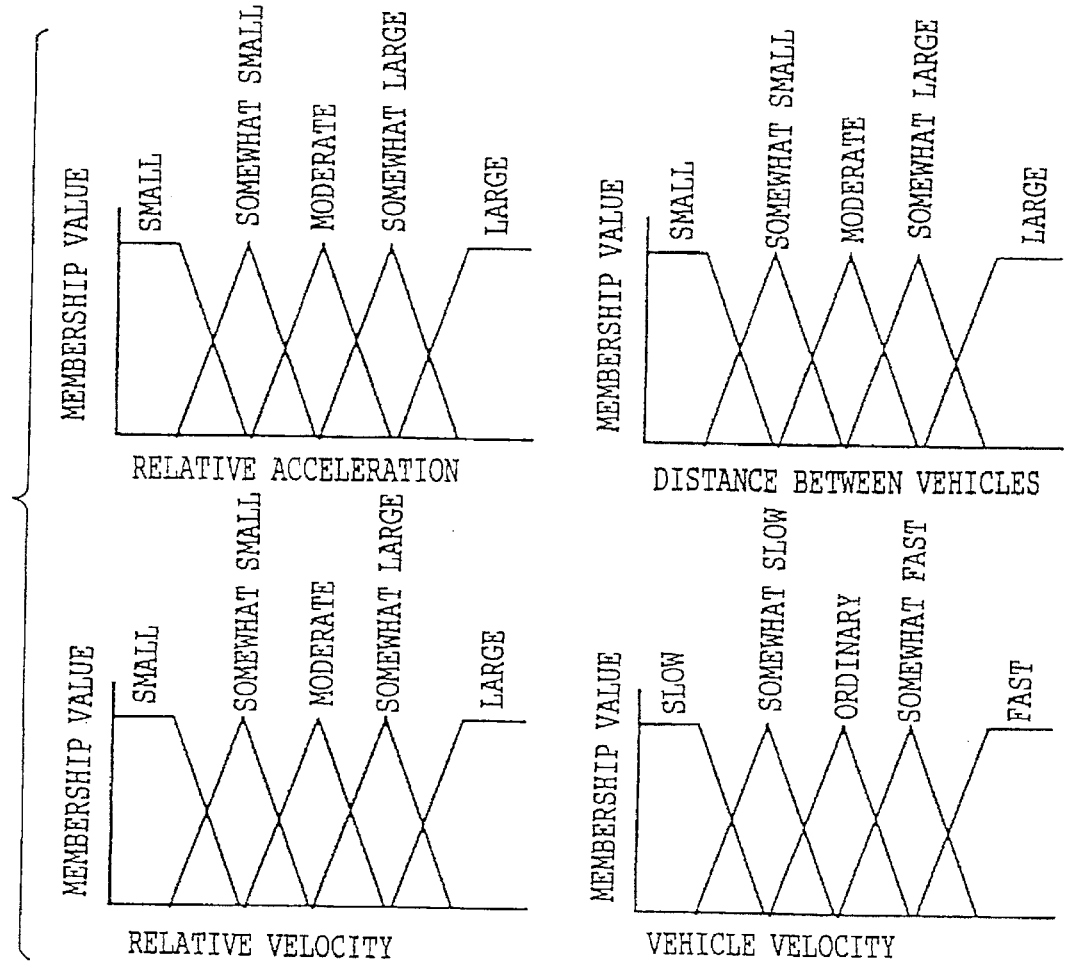
FIG. 13A are diagrams showing examples of the membership function of the antecedent portion when judgment on whether or not the alarm is generated is made by fuzzy inference.
FIG. 13B is a diagram showing an example of the membership function of the consequence portion when judgment on whether or not the alarm is generated is made by fuzzy inference.
Figure 13:
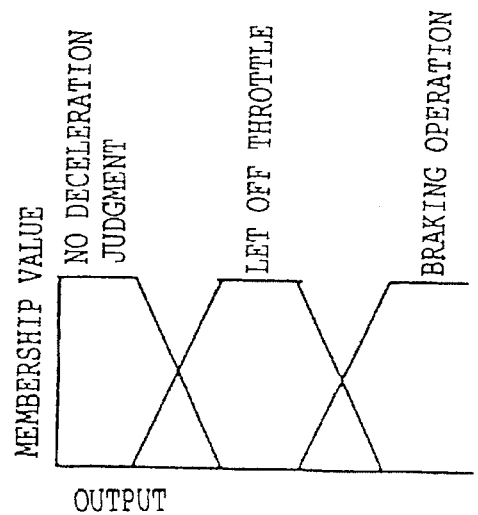

In addition, judgment as to whether or not it is necessary to perform a braking operation, whether or not it is necessary to let off the throttle to decelerate by engine braking, whether or not it is unnecessary to execute deceleration judgment and the like, may be performed by fuzzy inference. One example of this fuzzy inference is using relative acceleration G, the distance between vehicles HW, relative velocity V and vehicle velocity $V_x$ as inputs, and the degree of adaptation of each of the inputs with respect to each of a plurality of predetermined fuzzy rules is determined by using membership functions of the antecedent part determined for each of the inputs as shown in FIG. 13A. As fuzzy rules, it is possible to use rules which instruct any one of "brake operation", "release throttle" or "no deceleration judgment" can be used such that:

| Rule 1: | if relative acceleration = | large then brake operation |
|---|---|---|
| Rule 2: | if relative acceleration = and if relative velocity = and if distance between vehicles = | moderate somewhat large somewhat small then release the throttle |

Next, processing in which the instruction of each of the rules is weighed in accordance with the degree of adaptation of each of the rules to calculate an average value is performed using membership functions of the consequent part as shown in FIG. 13B, and thereby realized.

Figure 14:
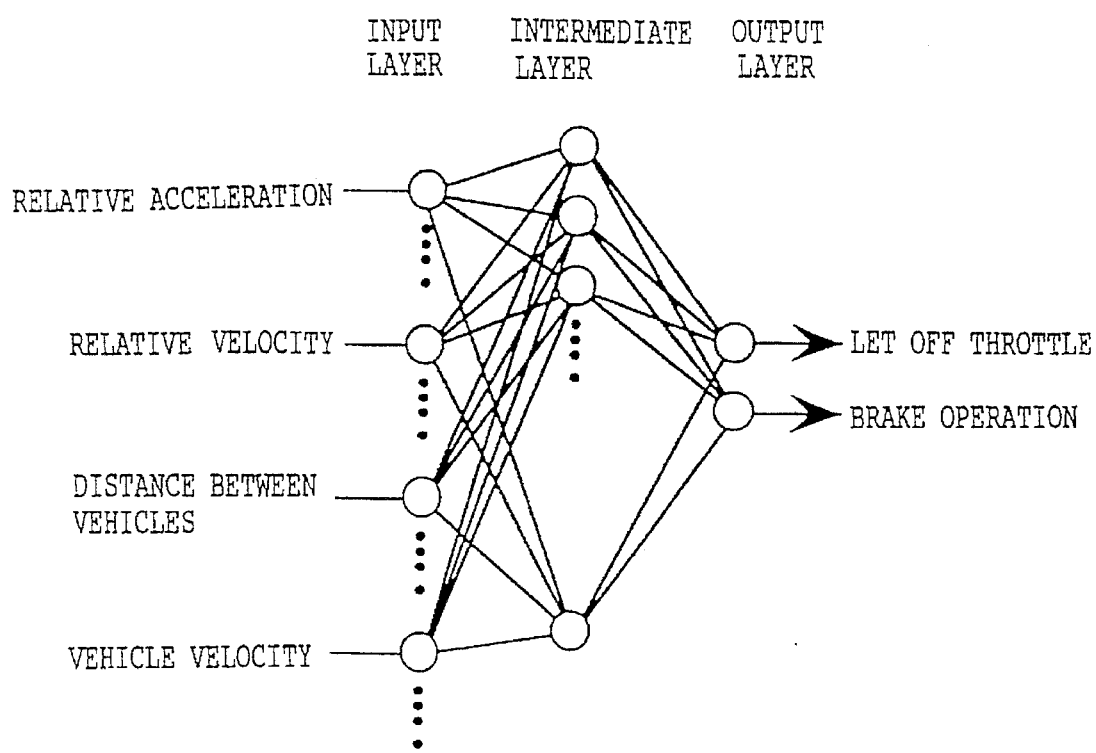
FIG. 14 is a figure conceptually showing an example of the neural network constitution when judgment on whether or not the alarm is generated is made using the neural network.

Further, in the above, the example in which the microcomputer is used as the control means 14 has been explained. However, instead of the microcomputer, a neural network comprising an input layer, an intermediate layer and an output layer (see FIG. 14 as one example) may be also used. In this case, such a neural network is constituted in which each of the data of relative acceleration, relative velocity, the distance between vehicles and subject vehicle velocity is inputted into each neuron of the input layer, and the necessity for letting off the throttle and the brake operation as control targets is outputted from the output layer. As the neural network, it is also possible to use one to which adequate learning has been applied beforehand. However, it is also acceptable to carry-out learning in which relative acceleration, relative velocity, the distance between vehicles and subject vehicle velocity are used as the inputs, using operation amounts of the throttle and the brake actually performed by the driver in a state in which the following running control apparatus is not allowed to work as model outputs.

In each of the above-mentioned embodiments, the examples in which the present invention is applied to the following running control apparatus have been explained. However, the present invention can be also applied to a running control apparatus for vehicles such as an obstacle avoiding apparatus for avoiding obstacles during running and the like.

Figure 15:
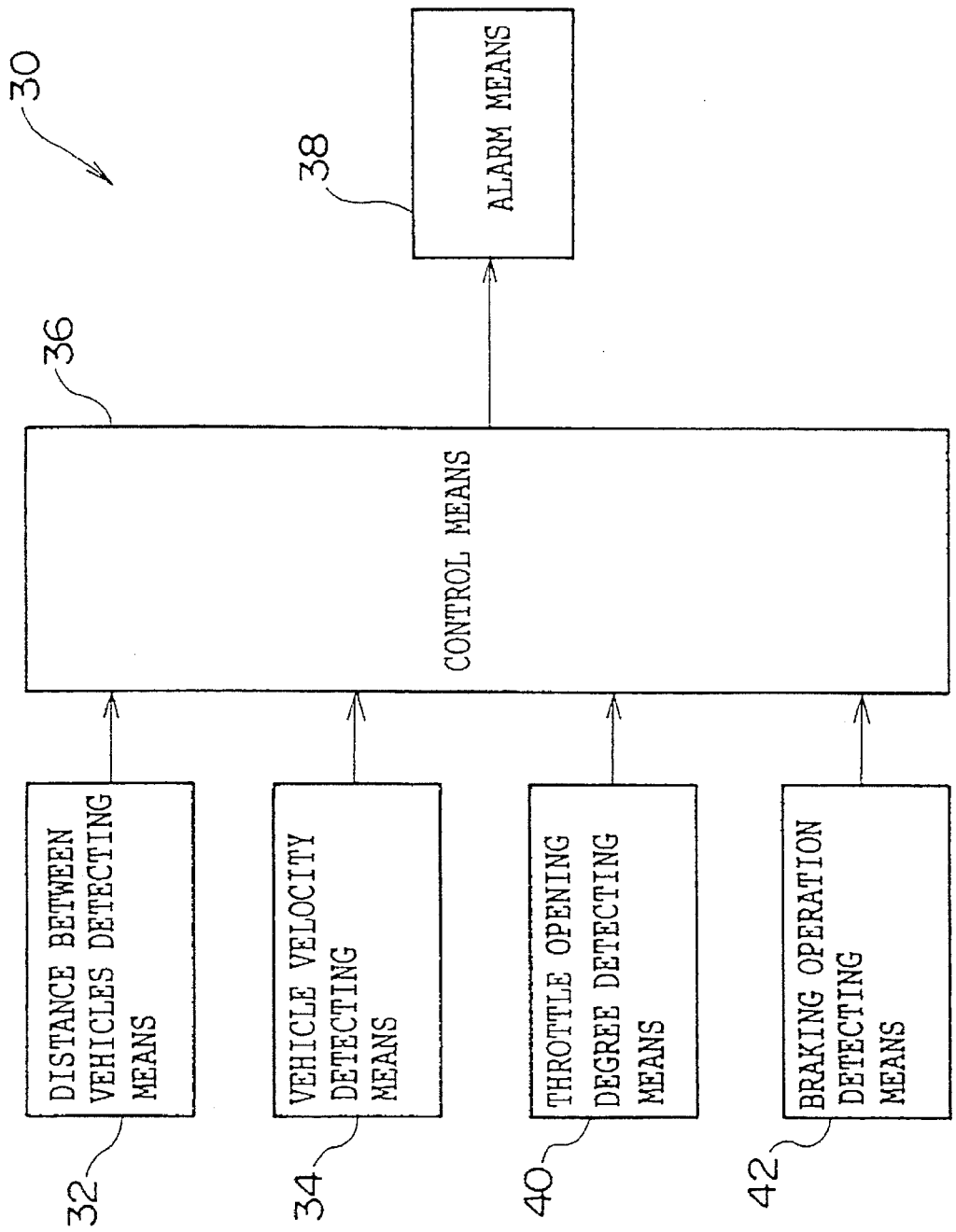
FIG. 15 is a block diagram showing the schematic constitution of an alarm apparatus for vehicles according to a third embodiment.

Next, the third embodiment is explained. FIG. 15 shows an alarm apparatus for vehicles 30 according to the present embodiment. The alarm apparatus for vehicles 30 is attached to a vehicle (not shown). The alarm apparatus 30 is provided with a distance between vehicles detecting means 32 for detecting a distance between a preceding vehicle and a subject vehicle, and a vehicle velocity detecting means 34 for detecting velocity of the subject vehicle. As the distance between vehicles detecting means 32 and the vehicle velocity detecting means 34, those explained above can be applied.

The distance between vehicles detecting means 32 and the vehicle velocity detecting means 34 are connected to a control means 36 constituted by a microcomputer or the like. An alarm means 38 which is provided with an alarm lamp, a buzzer and the like for generating an alarm to a driver, a throttle opening degree detecting means 40 for detecting the degree to which a throttle is opened in the subject vehicle, and a brake operation detecting means 42 for detecting whether or not a braking operation is performed, are connected to the control means 36. Incidentally, as the throttle opening degree detecting means 40 a throttle position sensor and the like can be adapted, and as the brake operation detecting means 24 a stop lamp switch and the like which turns on or off depending on whether or not the driver has stepped on the brake pedal can be adapted.

The control means 36 calculates relative velocity and relative acceleration between the preceding vehicle and the subject vehicle on the basis of the distance between the preceding vehicle and the subject vehicle as detected by the distance between vehicles detecting means 32, and control operation of the alarm means 38 on the basis of calculation results and detection results of the throttle opening degree detecting means 40 and the brake operation detecting means 42.

Figure 16:
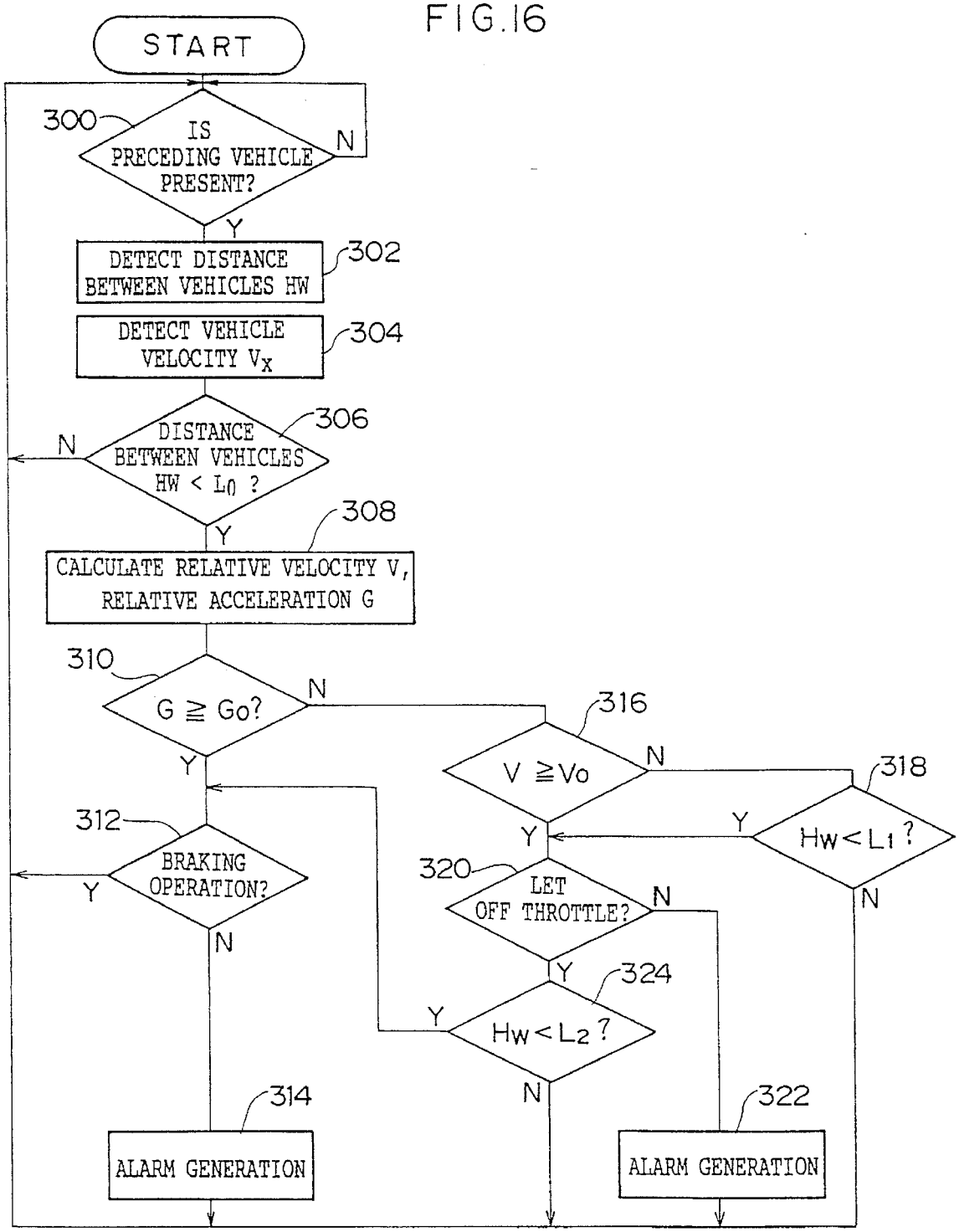
FIG. 16 is a flow chart explaining the operation of the third embodiment.

Next, the flow chart in FIG. 16 will be explained. Incidentally, the control means 36 is executed when an ignition switch of the vehicle is turned on. In step 300 in the flow chart in FIG. 16, it is judged whether or not a preceding vehicle is present in front of the subject vehicle. If the judgment in step 300 is affirmed, the routine moves to step 302, where the distance between vehicles detecting means 32 is instructed to perform detection of the distance between vehicles of the subject vehicle and the preceding vehicle. The detected distance between vehicles HW is fetched.

In the next step 304, vehicle velocity $V_x$ detected by the vehicle velocity detecting means 34 is fetched. In step 306, it is judged whether or not the distance between vehicles HW with respect to the preceding vehicle is smaller than a predetermined value $L_0$. The predetermined value $L_0$ is a reference value corresponding to a threshold value of the distance between vehicles for entering into a state in which the subject vehicle performs following running with respect to the preceding vehicle. This threshold value changes in accordance with the vehicle velocity of the subject vehicle, so that the predetermined value $L_0$ is set on the basis of a relationship between vehicle velocity $V_x$ and predetermined value $L_0$ prescribed beforehand (see FIG. 17 as one example). The value changes in accordance with vehicle velocity $V_x$.

If the judgment in step 306 is denied, then the risk of collision is low even if relative acceleration with respect to the preceding vehicle is large. The routine is then returned to step 300 without performing a judgment as to whether or not the alarm is generated. This is explained below. On the other hand, if the judgment in step 306 is affirmed, then in step 308, on the basis of a difference between the distance between vehicles $HW_i$ detected at this time and a distance between vehicles $HW_{i-1}$ detected at a previous time and the like, relative velocity V with respect to the preceding vehicle and relative acceleration G with respect to the preceding vehicle are calculated.

In step 310, it is judged whether or not relative acceleration G calculated in step 308 has a positive sign (the direction in which the subject vehicle and the preceding vehicle approach), and is not less than a predetermined value $G_0$ which is a sufficiently large value. Incidentally, the predetermined value $G_0$ is determined on the basis of a minimum value of relative acceleration which the driver is capable of sensing. As one example, a value of about 0.1–0.2 G is set. If the judgment in step 310 is affirmed, then it can be judged that a situation has arisen in which the subject vehicle and the preceding vehicle are in a state of relative approach at an acceleration not less than the predetermined value, and it is necessary to immediately operate the brake.

Thus, in step 312, it is judged whether or not the operation of the brake is performed on the basis of the detection result of the brake operation detecting means 42, and if the judgment in step 312 is denied, then it is judged that the driver does not recognize the above-mentioned situation, the alarm means 38 is operated in step 314, the alarm lamp of the alarm means 38 is lit, and the buzzer is sounded. The driver can thereby recognize the above-mentioned situation so as to immediately operate the brake for decelerating the vehicle, and avoid a rear-end collision with the preceding vehicle. Incidentally, if the operation of the brake has already been performed, the judgment in step 312 is affirmed. The routine is then returned to step 300 without generating the alarm.

On the other hand, if the judgment in step 310 is denied, the routine moves to step 316 where it is judged whether or not the sign of relative velocity V is positive (the direction in which the subject vehicle and the preceding vehicle are approaching), and whether or not relative velocity V with respect to the preceding vehicle is not less than a predetermined value $V_0$. Incidentally, the predetermined value $V_0$ is set on the basis of a minimum value of the relative velocity the driver is capable of sensing. As one example, a value of about 5–10 km/hr is set. If the judgment in step 316 is affirmed, the routine moves to step 320.

In addition, if the judgment in step 316 is denied, then it is judged in step 318 whether or not the distance between vehicles HW with respect to the preceding vehicle is smaller than a predetermined value $L_1$. Incidentally, the predetermined value $L_1$ is set to have a value which is smaller than the above-mentioned predetermined value $L_0$, which is determined such that (predetermined value $L_0$–predetermined value $L_1$) approximately coincides with a minimum value of a variation amount of the distance between vehicles the driver is capable of sensing. Therefore, the predetermined value $L_1$ has a value which is also changed in accordance with vehicle velocity $V_x$. Generally, the minimum value of the variation amount of the distance between vehicles the driver is capable of sensing is about 5–20% of an original distance between vehicles, so that, for example, when the original distance between vehicles is 30 m, the minimum value of the variation in the distance between vehicles the driver is capable of sensing is about 1.5–6 m. Hence a value of about 24–28.5 m is set for the predetermined value $L_1$. If the judgment in step 318 is denied, the routine returns to step 300. If the judgment is affirmed, the routine moves step 320.

As described above, the transfer to step 320 is performed if the judgment in step 316 is affirmed. Namely if the approach toward the preceding vehicle is made at a relative velocity that is not less than the predetermined value $V_0$ although relative acceleration with respect to the preceding vehicle is less than the predetermined value $G_0$, or if the judgment in step 318 is affirmed, namely if the distance between vehicles HW is smaller than the predetermined value $L_1$, and in such cases, it can be judged that a state has arisen in which it is necessary to decelerated vehicle velocity at least by means of engine braking.

Thus in step 320, it is judged whether or not the throttle is turned off on the basis of the detection result of the throttle opening degree detecting means 20. Namely, whether or not a state has arisen in which minute deceleration is performed by engine braking. If the judgment in step 320 is denied, then it is judged that the driver does not recognize the above-mentioned situation, the alarm means 38 is operated in step 322, the alarm lamp of the alarm means 38 is lit, and the buzzer is sounded. The driver can thereby recognize the above-mentioned situation so as to let off the throttle to perform minute deceleration of the vehicle by means of the engine braking, and to avoid falling into a state in which the risk of having a rear-end collision with the preceding vehicle is high.

Incidentally, the degree of emergency is different between the alarm generated in step 314 for promoting the braking operation and the alarm generated in step 322 for promoting deceleration by engine braking (the degree of emergency is higher in the alarm for promoting the braking operation), so that the degree of emergency and the necessary operation (either the braking operation or the letting off of the throttle) may be transmitted to the driver by, for example, the changing of the number and color of the alarm lamp to be lit, changing the sound volume or timbre of the buzzer and the like.

In addition, if the judgment in step 320 is affirmed, the routine moves to step 324 where it is judged whether or not the distance between vehicles HW with respect to the preceding vehicle is smaller than a predetermined value $L_2$.

Incidentally, the predetermined value $L_2$ is a reference value corresponding to a boundary value of the distance between vehicles in which the driver defers the brake operation, which is a value smaller than the predetermined value $L_1$ (namely $L>L_1>L_2$). The above-mentioned boundary value of the distance between vehicles also changes in accordance with the vehicle velocity of the subject vehicle and the like, so that the predetermined value $L_2$ is set on the basis of a relationship between the predetermined value $L_2$ and vehicle velocity $V_x$ determined beforehand taking into consideration the risk of having a collision when the preceding vehicle approaches (see FIG. 18 as one example). The value changes in accordance with vehicle velocity $V_x$.

If the judgment in step 324 is denied, then the routine returns to step 300. However, if the judgment is affirmed, then it can be judged that the distance between vehicles HW is rather small although relative acceleration with respect to the preceding vehicle is smaller than the predetermined value $G_0$, and deceleration by engine braking is insufficient. Thus, the routine moves to step 312 where it is judged whether or not the operation of the brake is performed in the same manner as described above. If the judgment is denied, then the alarm means is operated.

Figure 19:
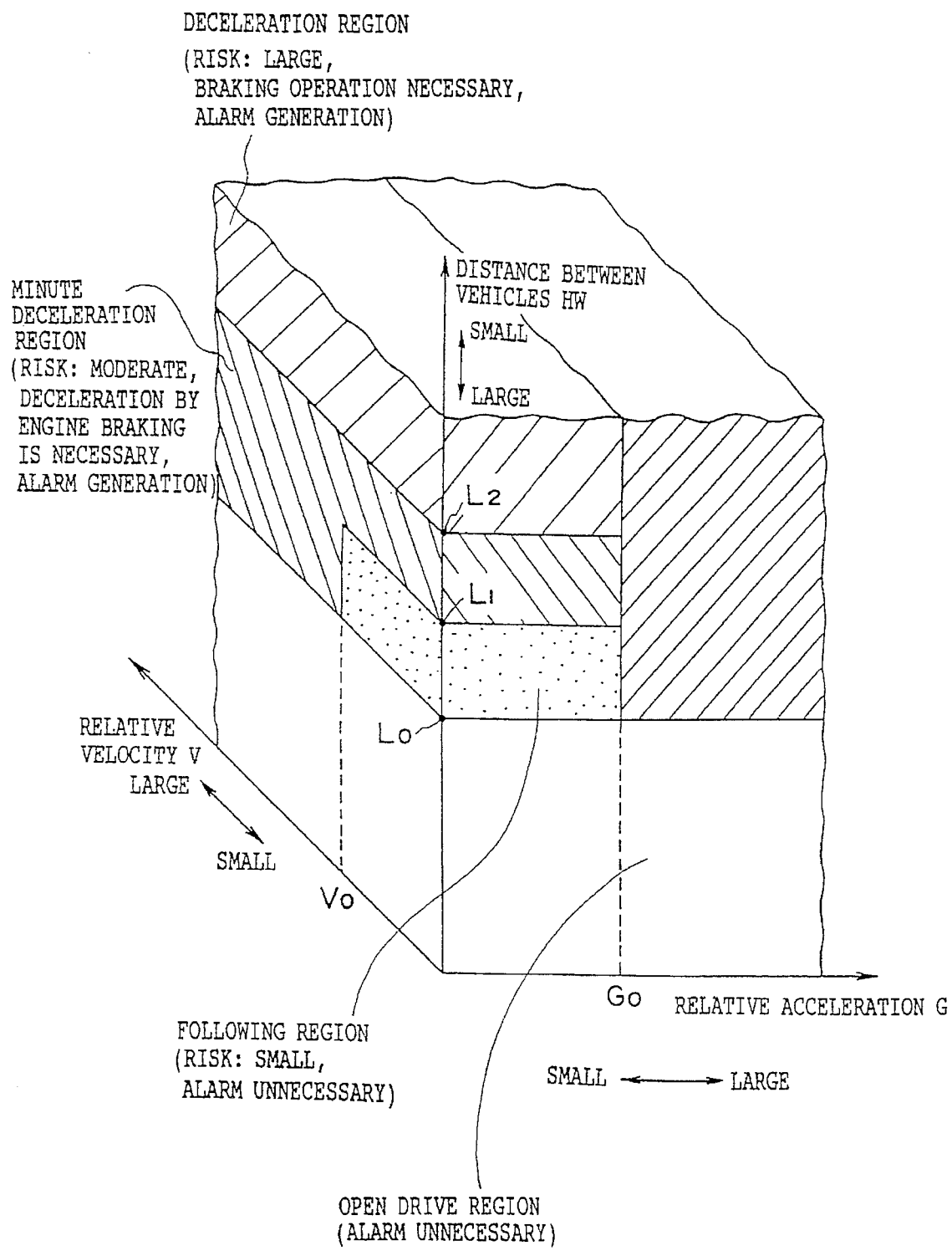
FIG. 19 is a figure conceptually illustrating a relation between the judgment for generating the alarm and the distance between vehicles HW, relative velocity V and the relative acceleration G.

The relationship between the judgment of the generation of the alarm and the distance between vehicles HW, relative velocity V and relative acceleration G as explained above is illustratively shown in FIG. 19. In the present embodiment, the alarm is generated if it is judged that a "deceleration region" and a "minute deceleration region" in FIG. 19 are given. Incidentally, the magnitude of the predetermined value $L_1$ and the predetermined value $L_2$ changes in accordance with vehicle velocity $V_x$ as described above. In addition, a region in which the distance between vehicles HW is smaller than the predetermined value $L_0$ (region comprising "deceleration region", "minute deceleration region" and "following region") is a region in which it is postulated that the driver performs driving in which vehicle velocity is controlled in accordance with the distance between vehicles with respect to the preceding vehicle. However, in the "following region" in which relative acceleration G and relative velocity V are comparatively small and the distance between vehicles HW is comparatively large, the alarm is not generated because the risk is small.

Figure 17:
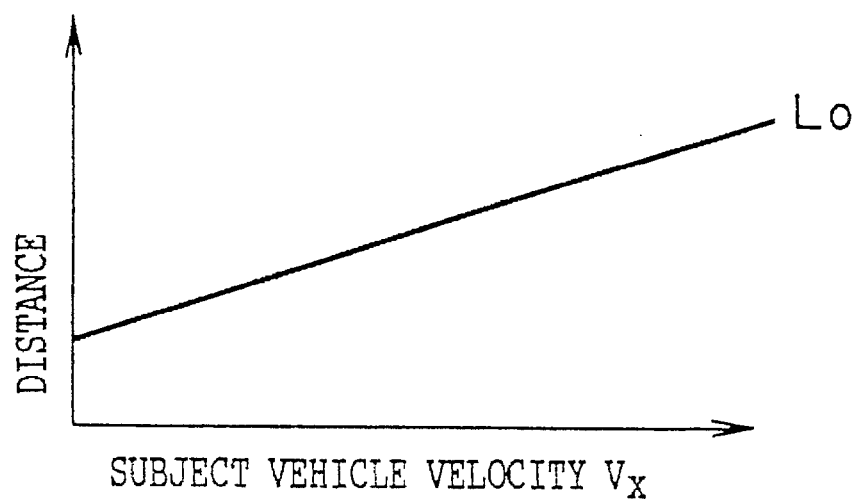
FIG. 17 is a diagram showing a relation between subject vehicle velocity and a predetermined value $L_0$ as a reference value of the distance between vehicles.

Incidentally, in the present embodiment, upon setting the value of the predetermined value $L_0$, the relationship was used in which the predetermined value $L_0$ changes linearly with respect to vehicle velocity $V_x$ as shown in FIG. 17. However, the present invention is not limited thereto, and for example, the value may be set using a relationship in which the predetermined value $L_0$ simply increases and changes in a curved manner with respect to an increase in vehicle velocity $V_x$. In addition, the predetermined value $L_0$ determined by using the relationship as described above may be corrected in accordance with, for example, an average distance between vehicles in the past and the like.

Figure 18:
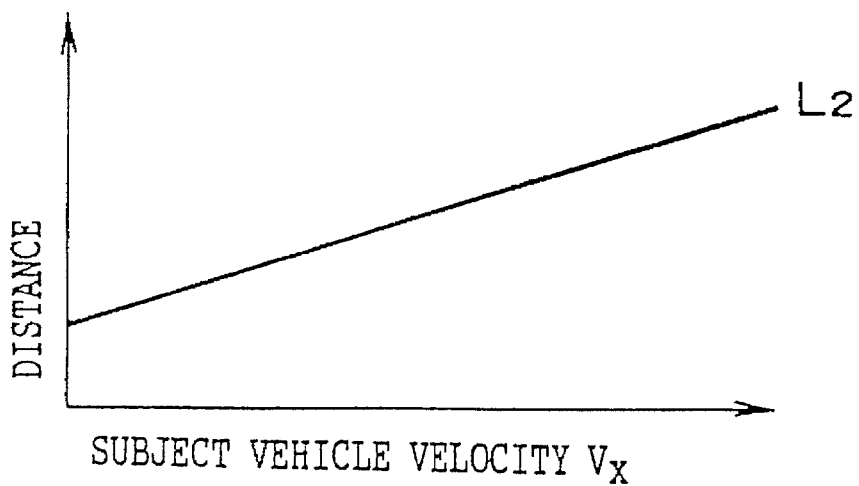
FIG. 18 is a diagram showing a relation between subject vehicle velocity and a predetermined value $L_2$ as a reference value of the distance between vehicles.

Also, with respect to the predetermined value $L_2$, there is no limitation to the setting of the value using the relationship shown in FIG. 18, and in the same manner as described above, the value may be set by using a relationsip in which the predetermined value $L_2$ simply increases and changes in a curved manner with respect to an increase in vehicle velocity $V_x$. In addition, the value of the predetermined value $L_2$ may be corrected in accordance with relative velocity V. Namely, there is given:

$$L_{2m}=L_2+\Delta L_2(V) \quad (3)$$

However, $L_{2m}$ is a value after correction, and $\Delta L_2$ is a correction value, wherein the judgment in the above-mentioned step 324 may be performed by using the value $L_{2m}$ after correction. The correction value $\Delta L_2$ can be determined by using a relation between relative velocity V and the correction value $\Delta L_2$ shown in FIG. 20 as one example. Incidentally, it is needless to say that the predetermined value $L_2$ in the equation (3) is allowed to have its value which may be changed in accordance with vehicle velocity $V_x$ on the basis of the relation shown in FIG. 18 and the like.

Further, the boundary value of the distance between vehicles in which the driver defers the brake operation also changes depending on surrounding circumstances such as how crowded of the running road is, the average velocity of the flow of traffic on the running road and the like, and for example, on a crowded expressway, the boundary value of the distance between vehicles of the vehicle running at 100 km/hr sometimes becomes about 10 m. Thus, also with respect to the predetermined value $L_2$, the value may be further corrected in accordance with the surrounding circumstance.

In addition, the judgment as to whether or not it is necessary to perform the brake operation, whether or not it is necessary to let off of the throttle to decelerate by engine braking, whether or not it is unnecessary to perform the deceleration judgment and the like may be performed by fuzzy inference which was explained in the above.

Further, the example in which the microcomputer is used as the control means 36 has been explained above. However, instead of the microcomputer, the neural network explained above may be used.

In addition, in each of the above-mentioned embodiments, relative velocity and relative acceleration have been indirectly detected by making calculations from the distance between vehicles. However, the present invention is not limited thereto. It is also possible that the distance between vehicles and relative velocity are directly detected using a Doppler radar range finder and the like. In addition, relative acceleration is indirectly detected by a calculation such as differentiation and the like from the detected relative velocity.

We claim:

1. A running control apparatus for vehicles, comprising:
relative acceleration detecting means for detecting a relative acceleration between a subject vehicle and an object;
judging means for judging whether the subject vehicle and the object relatively approach each other at the relative acceleration detected by the relative acceleration detecting means not less than a predetermined value of relative acceleration; and
control means for controlling the subject vehicle velocity such that the relative acceleration for which a direction to make a relative approach of the subject vehicle and the object positive is not more than a predetermined target value of relative acceleration when the judging means judges that the subject vehicle and the object relatively approach each other at the relative acceleration not less than the predetermined value of relative acceleration, wherein said relative acceleration detecting means includes a radar means for obtaining at least one of the distance and the relative speed therebetween, and the relative acceleration is obtained by differentiating the obtained one of the distance and the relative speed thereof.

2. The running control apparatus for vehicles according to claim 1, wherein said control means controls a relative velocity after it controls the relative acceleration to be not more than the predetermined target value of relative acceleration.

3. The running control apparatus for vehicles according to claim 1, wherein said control means controls a distance between the subject vehicle and the object after it controls the relative acceleration to be not more than the predetermined target value of relative acceleration.

4. The running control apparatus for vehicles according to claim 1, further comprising:

distance detecting means for detecting a distance between a subject vehicle and an object;

relative velocity detecting means for detecting a relative velocity between the subject vehicle and the object; and deceleration means for decelerating the subject vehicle when: the relative acceleration detected by the relative acceleration detecting means between the subject vehicle and the object is less than a predetermined value of relative acceleration, the distance detected by the distance detecting means between the subject vehicle and the object is less than a first predetermined value of distance and not less than a second predetermined value of distance which is smaller than the first predetermined value of distance, and the subject vehicle and the object relatively approach each other at the relative velocity detected by the relative velocity detecting means not less than a predetermined value of relative velocity; and when the relative acceleration detected by the relative acceleration detecting means between the subject vehicle and the object is less than the predetermined value of relative acceleration, and the distance detected by the distance detecting means between the subject vehicle and the object is less than a third predetermined value of distance and not less than said second predetermined value of distance, said third predetermined value of distance is smaller than said first predetermined value of distance and larger than said second predetermined value of distance.

5. The running control apparatus for vehicles according to claim 4, further comprising an additional deceleration means for decelerating the subject vehicle at a deceleration not less than a predetermined value of deceleration when the distance between the subject vehicle and the object is less than the first predetermined value of distance, and the subject vehicle and the object relatively approach each other at an acceleration not less than the predetermined value of acceleration, and the distance between the subject vehicle and the object is less than the second predetermined value of distance.

6. The running control apparatus for vehicles according to claim 5, wherein said additional deceleration means, when the distance between the subject vehicle and the object is less than the first predetermined value of distance, and the subject vehicle and the object relatively approach each other at the relative acceleration not less than the predetermined value of acceleration, performs:

pressure addition of a brake pressure when the relative acceleration is not less than a predetermined sufficiently small positive value of relative acceleration $G_0$ and the relative velocity is not less than a predetermined sufficiently small positive value of relative velocity $V_0$, and when the distance between the subject vehicle and the object is less than a safe distance between vehicles $HW_0$;

pressure reduction of the brake pressure when the relative acceleration is smaller than said positive value of relative acceleration $G_0$, the relative velocity is smaller than said positive value of relative velocity $V_0$, the distance between the subject vehicle and the object is not less than the safe distance between vehicles $HW_0$, the relative velocity is smaller than a predetermined value of relative velocity Vm which is smaller than said positive value of relative velocity $V_0$, and the subject vehicle and a preceding vehicle move further apart; and maintaining of brake pressure when the relative acceleration is smaller than said positive value of relative acceleration $G_0$, the relative velocity is smaller than said positive value of relative velocity $V_0$, the distance between the subject vehicle and the object is not less than the safe distance between vehicles $HW_0$, and the relative velocity is not less than said predetermined value of relative velocity Vm.

7. The running control apparatus for vehicles according to claim 4, wherein said first predetermined value of distance and said second predetermined value of distance are determined such that they become large as the subject vehicle velocity increases.

8. The running control apparatus for vehicles according to claim 4, wherein when said first predetermined value of distance is HW1, and a proportional constant K is a value within a range of 0.05<K<0.2, then the third predetermined value of distance HW2 is determined to satisfy the following equation:

$$HW1-HW2=K \cdot HW1.$$

9. The running control apparatus for vehicles according to claim 4, further comprising:

judging means for judging whether deceleration by braking operation is performed; and alarm means for generating an alarm when it is judged that the subject vehicle and the object relatively approach each other at the relative acceleration detected by the relative acceleration detecting means not less than a predetermined value of acceleration, the distance detected by the distance detecting means between the subject vehicle and the object is not more than a predetermined value of distance, and the deceleration by the braking operation of the subject vehicle is not performed.

10. The alarm apparatus for vehicles according to claim 9, wherein the predetermined value of distance in relation to the distance between the subject vehicle and the object is determined such that it becomes large as a subject vehicle velocity increases.

11. The running control apparatus for vehicles according to claim 4, further comprising:

judging means for judging whether deceleration by engine braking is performed; and alarm means for generating an alarm when it is judged that the relative acceleration detected by the relative acceleration detecting means between the subject vehicle and the object is less than a predetermined value of relative acceleration, the distance detected by the distance detecting means between the subject vehicle and the object is not more than a first predetermined value of distance, the subject vehicle and the object relatively approach each other at the relative velocity detected by the relative velocity detecting means not less than a predetermined value of velocity, and the judging means judges that deceleration of the subject vehicle by engine braking is not performed, and when it is judged that the relative acceleration detected by the relative acceleration detecting means between the subject vehicle and the object is less than the predetermined value of relative acceleration, the distance detected by the distance detecting means between the subject vehicle and the object is not more than a second predetermined value of distance, which is smaller than said first predetermined value of distance, and the judging means judges that deceleration of the subject vehicle by engine braking is not performed.

12. The alarm apparatus for vehicles according to claim 11, wherein said first predetermined value of relative distance and said second predetermined value of relative distance are determined such that they become large as a subject vehicle velocity increases.

13. The running control apparatus according to claim 1, wherein said control means comprises a neural network.

14. The running control apparatus for vehicles according to claim 1, wherein said radar means comprises a radar range finder.

* * * * *